(12) United States Patent
Nakamura et al.

(10) Patent No.: US 9,284,461 B2
(45) Date of Patent: Mar. 15, 2016

(54) AQUEOUS INK COMPOSITION, INKJET RECORDING METHOD, AND INKJET PRINTED ARTICLE

(75) Inventors: Ippei Nakamura, Ashigarakami-gun (JP); Hirokazu Kyota, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 267 days.

(21) Appl. No.: 13/194,053

(22) Filed: Jul. 29, 2011

(65) Prior Publication Data

US 2012/0052256 A1 Mar. 1, 2012

(30) Foreign Application Priority Data

Aug. 24, 2010 (JP) ................... 2010-187584

(51) Int. Cl.
*C09D 11/101* (2014.01)
*C09D 11/30* (2014.01)
*C09D 11/38* (2014.01)

(52) U.S. Cl.
CPC .............. *C09D 11/101* (2013.01); *C09D 11/30* (2013.01); *C09D 11/38* (2013.01); *Y10T 428/24802* (2015.01)

(58) Field of Classification Search
CPC ...... C09D 11/101; C09D 11/38; C09D 11/30; Y10T 428/24802
USPC ....................................................... 523/160
See application file for complete search history.

(56) References Cited

U.S. PATENT DOCUMENTS

| | | | | |
|---|---|---|---|---|
| 3,886,103 | A * | 5/1975 | Koizumi et al. | 524/104 |
| 4,793,860 | A * | 12/1988 | Murakami et al. | 106/31.52 |
| 5,981,623 | A * | 11/1999 | McCain et al. | 523/160 |
| 6,200,371 | B1 | 3/2001 | Meyrick et al. | |
| 6,235,096 | B1 | 5/2001 | Meyrick et al. | |
| 6,344,497 | B1 | 2/2002 | Meyrick et al. | |
| 2002/0028302 | A1* | 3/2002 | Okazaki et al. | 427/487 |
| 2005/0007432 | A1* | 1/2005 | Kanaya et al. | 347/100 |
| 2008/0085950 | A1 | 4/2008 | Ganapathiappan et al. | |
| 2009/0131577 | A1 | 5/2009 | Kato et al. | |

FOREIGN PATENT DOCUMENTS

| | | |
|---|---|---|
| CN | 1232481 A | 10/1999 |
| CN | 133016 A | 1/2002 |
| CN | 1330106 A | 1/2002 |
| EP | 0 534 427 A2 | 3/1993 |
| EP | 0 878 482 A1 | 11/1998 |
| EP | 1 857 478 A1 | 11/2007 |
| JP | 2002-053604 A | 2/2002 |
| JP | 2002-284829 A | 10/2002 |
| JP | 2005-307199 A | 11/2005 |
| JP | 2009-299005 A | 12/2009 |

OTHER PUBLICATIONS

Butyl Carbitol Solvent—Technical Data Sheet, pp. 1-2, Dow Chemical Compant, (2012), obtained online from http://msdssearch.dow.com/PublishedLiteratureDOWCOM/dh_08ac/0901b803808aca8a.pdf?filepath=oxysolvents/pdfs/noreg/110-00624.pdf&fromPage=GetDoc.*
Communication, dated Oct. 24, 2011, issued in corresponding EP Application No. 11175211.9, 5 pages.
Office Action dated Mar. 11, 2014 in Japanese Office Action No. 2010-187584.
Office Action dated Feb. 12, 2014 in Chinese Office Action No. 201110220843.9.

* cited by examiner

*Primary Examiner* — Alexander Kollias
(74) *Attorney, Agent, or Firm* — Sughrue Mion, PLLC

(57) ABSTRACT

The invention provides an aqueous ink composition, including a compound containing a water-soluble group and at least two groups each represented by following Formula (1);
a colorant; and
water:

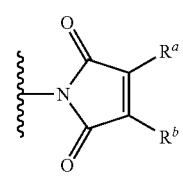

(1)

wherein, in Formula (1), $R^a$ and $R^b$ each independently represent an alkyl group having 1 to 4 carbon atoms, and $R^a$ and $R^b$ may be bonded to each other to form a 4-membered to 6-membered ring.

5 Claims, No Drawings

AQUEOUS INK COMPOSITION, INKJET RECORDING METHOD, AND INKJET PRINTED ARTICLE

CROSS-REFERENCE TO RELATED APPLICATIONS

This application is based on and claims priority under 35 USC 119 from Japanese Patent Application No. 2010-187584 filed on Aug. 24, 2010, the disclosure of which is incorporated by reference herein.

BACKGROUND

1. Technical Field

The present invention relates to an aqueous ink composition, an inkjet recording method, and an inkjet printed article.

2. Related Art

Image recording methods for forming images on a recording medium such as paper in accordance with data signals of the images include an electrophotographic recording method, a sublimation or fusion thermal transfer method, an inkjet recording method, and the like. Since the electrophotographic recording method requires a process of forming an electrostatic latent image on a photoreceptor drum by means of electric charge and light exposure, there arise problems in that a relatively more complicate system is necessary, leading to higher production costs. On the other hand, while the apparatus used for a thermal transfer method is inexpensive, there are problems in that use of ink ribbons causes higher running costs and generates waste materials.

In contrast, in an inkjet recording method, an image is formed directly on a recording medium by ejecting ink only to the desired image portion using an inexpensive apparatus. Thus, the inkjet recording method is an excellent image recording method which enables efficient use of ink, of which running cost thereof is inexpensive, and which generates little noise.

Among the ink compositions used for inkjet recording of an image, an active energy ray-curable aqueous ink may be suitably used for printing of an image, a pre-treatment for imparting printability to a recording medium, a post-treatment for protecting and/or modifying a printed image, or the like. Furthermore, since the active energy ray-curable aqueous ink contains water as the main component, it is highly safe and applicable to a high-density inkjet recording owing to a lower viscosity thereof. Thus, the active energy ray-curable aqueous ink serves as a technique having many excellent characteristics and potential.

Examples of basic constitutional materials of an active energy ray-curable aqueous ink include water, a polymerizable substance, a polymerization initiator that generates a radical in response to a radiation and initiates polymerization, and a colorant (such as a pigment or a dye). Of these, a polymerizable substance, polymerization initiator, or the like may be used as in the form of an emulsion, or may be modified with an appropriate substituent to have water solubility and then prepared into a solution. For instance, Japanese Patent Application Laid-Open (JP-A) No. 2005-307199 discloses examples of aqueous polymerizable substances and aqueous polymerization initiators, and discloses an inkjet recording ink composition with which a film having excellent adhesiveness is obtained by light exposure.

SUMMARY

According to an aspect of the present invention, there is provided an aqueous ink composition, including:

Component A: a compound comprising a water-soluble group and at least two groups each represented by following Formula (1);
Component B: a colorant; and
Component C: water:

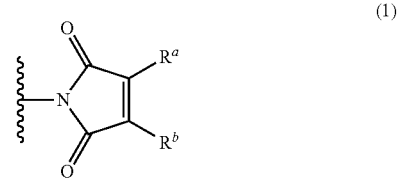

(1)

wherein, in Formula (1), $R^a$ and $R^b$ each independently represent an alkyl group having 1 to 4 carbon atoms, and $R^a$ and $R^b$ may be bonded to each other to form a 4-membered to 6-membered ring.

DETAILED DESCRIPTION

Aqueous Ink Composition

The aqueous ink composition of the present invention includes: (Component A) a compound having a water-soluble group and at least two groups each represented by following Formula (1); (Component B) a colorant; and (Component C) water.

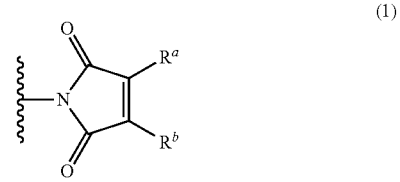

(1)

In Formula (1), $R^a$ and $R^b$ each independently represent an alkyl group having 1 to 4 carbon atoms; and $R^a$ and $R^b$ may be bonded to each other to form a 4-membered to 6-membered ring.

In the specification, the recitation "to" means to include the lower limit and the upper limit of the numerical values recited in front of and posterior to "to".

The inventors of the present invention have made extensive study on ink compositions suitably used for inkjet recording. As a result, the inventors have succeeded in improving ejection property and the like while not using a photopolymerization initiator or reducing the amount of a photopolymerization initiator to be used, by using a specific compound having a maleimide structure, a colorant, and water. Although the mechanism of the invention is not clear, the inventors assume as follows: that is, use of a specific compound having a maleimide structure, a colorant, and water enables improvement in miscibility of the respective components in a composition, and enables appropriate control of evaporation speeds of volatile components so that the components included in the ink composition tend less precipitate around the nozzle of an inkjet head, which lead to improvement in ejection property and the like.

Hereinbelow, the aqueous ink composition (hereinbelow, may be simply referred to as "ink composition") of the invention is described in detail.

<(Component A) Compound Having Water-Soluble Group and at Least Two Groups Each Represented by Formula (1)>

The compound having a water-soluble group and at least two groups each represented by following Formula (1) may not be particularly limited as long as it is a compound having a water-soluble group and at least two groups each represented by following Formula (1) in the molecule. Since the Component A used in the invention has a water-soluble group, it is capable of stably dissolving and being dispersed in water. Furthermore, since a compound having at least two groups each represented by Formula (1) is used, it is possible to increase the cross-linking reaction of an ink composition.

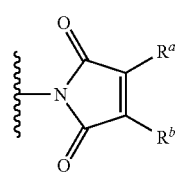

(1)

In Formula (1), $R^a$ and $R^b$ each independently represent an alkyl group having 1 to 4 carbon atoms, and $R^a$ and $R^b$ may be bonded to each other to form a 4-membered to 6-membered ring.

In Formula (1), $R^a$ and $R^b$ may each be substituted or unsubstituted, but it is preferable that $R^a$ and $R^b$ each are unsubstituted.

$R^a$ and $R^b$ each independently represent an alkyl group which has 1 to 4 carbon atoms, and which may have a linear structure or branched structure. Specific example thereof include a methyl group, an ethyl group, a propyl group, an isopropyl group, a butyl group, an isobutyl group, a sec-butyl group, and a t-butyl group. $R^a$ and $R^b$ may be bonded to each other to form a a 4-membered to 6-membered ring. From the viewpoints of physical properties of an cured ink film, such as solvent resistance and adhesiveness to a base material after the ink composition has been cured, it is preferable that $R^a$ and $R^b$ each represent an alkyl group having 1 or 2 carbon atoms, that is, a methyl group or an ethyl group, and it is more preferable that $R^a$ and $R^b$ each represent a methyl group. When $R^a$ and $R^b$ are bonded to each other to form a 4-membered to 6-membered ring, it is preferable that $R^a$ and $R^b$ form a 5-membered or 6-membered ring, and more preferably a 6-membered ring.

The Component A used in the invention is water-soluble or water-dispersible. It is preferable that 1 g of the Component A is capable of dissolving or being dispersed in water in an amount of less than 30 ml, more preferably in an amount of less than 20 ml, and further more preferably in an amount of 10 ml. From the viewpoints of ejection stability at the time of inkjet printing and storage stability of the ink composition, it is preferable that the Component A be water-soluble.

The water-soluble group included in the Component A is not limited as long as it is a group capable of imparting water solubility or water dispersibility to the compound of Component A. The water-soluble group may be preferably a group selected from the group consisting of metal salts and onium salts of carboxylic acid, metal salts and onium salts of sulfonic acid, phosphoric acid, metal salts and onium salts of phosphoric acid, phosphonic acid, metal salts and onium salts of phosphonic acid, and quaternary ammonium salts; more preferably a group selected from the group consisting of metal salts and onium salts of carboxylic acid, metal salts and onium salts of sulfonic acid, phosphoric acid, metal salts and onium salts of phosphoric acid, phosphonic acid, and metal salts and onium salts of phosphonic acid; particularly preferably a group selected from the group consisting of metal salts and onium salts of carboxylic acid, and metal salts and onium salts of sulfonic acid; and most preferably a group selected from the group consisting of metal salts and onium salts of carboxylic acid.

The metal salts of carboxylic acid are preferably an alkali metal salt of carboxylic acid. Specific examples of a group formed from a metal salt of carboxylic acid include —COOLi, —COONa, and —COOK, and —COONa or —COOK is more preferable.

Examples of onium salts of carboxylic acid include an ammonium salt of carboxylic acid, a pyridinium salt of carboxylic acid, and a phosphonium salt of carboxylic acid, and an ammonium salt of carboxylic acid is preferable.

Specific examples of onium salts of carboxylic acid include a tetraalkylammonium salt of carboxylic acid and trialkylarylammonium salt of carboxylic acid, and a tetraalkylammonium salt of carboxylic acid is preferable. The alkyl group included in the ammonium salt is preferably an alkyl group having 1 to 4 carbon atoms, and the aryl group included in the ammonium salt is preferably a phenyl group.

The metal salts of sulfonic acid is preferably an alkali metal salt of sulfonic acid. Specific examples of a group formed from a metal salt of sulfonic acid include —$SO_3Li$, $SO_3Na$, and —$SO_3K$, and —$SO_3Na$ or —$SO_3K$ is more preferable.

Examples of onium salts of sulfonic acid include an ammonium salt, a pyridinium salt, and phosphonium salt of sulfonic acid, and an ammonium salt is preferable. Specific examples of a group formed from an onium salt of sulfonic acid include a tetraalkylammonium salt of sulfonic acid and a trialkylarylammonium salt of sulfonic acid, and a tetraalkylammonium salt of sulfonic acid is preferable. The alkyl group included in the ammonium salt is preferably an alkyl group having 1 to 4 carbon atoms, and the aryl group included in the ammonium salt is preferably a phenyl group.

The metal salts of phosphoric acid is preferably an alkali metal salt of phosphoric acid. Specific examples of metal salt of phosphoric acid include a sodium salt and a potassium salt of phosphoric acid, and a sodium salt of phosphoric acid is preferable.

Examples of onium salts of phosphoric acid include an ammonium salt, a pyridinium salt, and a phosphonium salt of phosphoric acid, and an ammonium salt of phosphoric acid is preferable. Specific examples of onium salts of phosphoric acid include a tetraalkylammonium salt of phosphoric acid and a trialkylarylammonium salt of phosphoric acid, and a tetraalkylammonium salt of phosphoric acid is preferable. The alkyl group included in the ammonium salt is preferably an alkyl group having 1 to 4 carbon atoms, and the aryl group included in the ammonium salt is preferably a phenyl group.

The metal salts of phosphonic acid is preferably an alkali metal salt of phosphonic acid. Specific examples of a group formed from a metal salt of phosphonic acid include a sodium salt and potassium salt of phosphonic acid, and a sodium salt of phosphonic acid is preferable.

Examples of onium salts of phosphonic acid include an ammonium salt, a pyridinium salt, and a phosphonium salt of phosphonic acid, and an ammonium salt of phosphonic acid is preferable. Specific examples of a group formed from an onium salt of phosphonic acid include a tetraalkylammonium salt of phosphonic acid and a trialkylarylammonium salt of phosphonic acid, and a tetraalkylammonium salt of phosphonic acid is preferable. The alkyl group included in the ammonium salt is preferably an alkyl group having 1 to 4 carbon atoms, and the aryl group included in the ammonium salt if preferably a phenyl group.

Examples of quaternary ammonium salts include a salt formed from a quaternary ammonium ion and a halide ion, a salt formed from a quaternary ammonium ion and an organic anion such as a sulfonate ion, a phosphate ion, or a phosphonate ion, and a salt formed from a quaternary ammonium ion and a fluorine atom-containing anion such as $BF_4^-$, $PF_6^-$, or $SbF_6^-$, and a salt formed from a quaternary ammonium ion and a halide ion is preferable.

The quaternary ammonium ion preferably has a trialkylammonium structure containing an alkyl group preferably having 1 to 10 carbon atoms, and more preferably having 1 to 5 carbon atoms. Specifically, the quaternary ammonium ion preferably has a trimethylammonium structure or a triethylammonium structure.

Specific examples of quaternary ammonium salt include —$N^+(CH_3)_3Cl^-$, —$N^+(C_2H_5)_3Cl^-$, and —$N^+(C_4H_9)_3Cl^-$, and —$N^+(CH_3)_3Cl^-$ or —$N^+(C_2H_5)_3Cl^-$ is preferable.

The number of water-soluble groups is not limited as long as the component A is water-soluble or water-dispersible. For example, the component A may has only one water-soluble group, or may have plural water-soluble groups, and the number of water-soluble groups is appropriately selected in accordance with the type, molecular weight, or the like of the water-soluble groups.

The Component A may be a low-molecular-weight compound having a molecular weight of from 300 to 2,000, or may be a high-molecular-weight compound (hereinbelow, may also be referred to as "polymer compound") having an average molecular weight of 5,000 or more. From the viewpoints of solvent resistance and adhesiveness to a base material after the ink composition has been cured, the Component A is preferably a high-molecular-weight compound having an average molecular weight of 5,000 or more.

When the Component A is a low-molecular-weight compound having a molecular weight of 300 to 2,000, it is preferable that one molecule of (Compound A) contain 2 to 6 groups, more preferably 2 to 4 groups, further more preferably 2 to 3 groups, and particularly preferably 2 groups, each represented by Formula (1).

When the Component A is a low-molecular-weight compound having a molecular weight of from 300 to 2,000, the Component A is preferably a compound represented by following Formula (1-L).

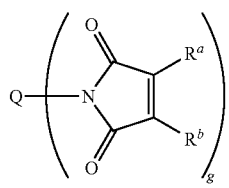

(1-L)

In Formula (1-L), $R^a$ and $R^b$ each independently represent an alkyl group having 1 to 4 carbon atoms; $R^a$ and $R^b$ may be bonded to each other to form a 4-membered to 6-membered ring; and Q represents a g-valent linking group having a water-soluble group, in which g represents an integer of 2 to more.

In Formula (1-L), $R^a$ and $R^b$ each independently represent an alkyl group having 1 to 4 carbon atoms, and $R^a$ and $R^b$ may be bonded to each other to form a 4-membered to 6-membered ring. $R^a$ and $R^b$ in Formula (1-L) have the same definitions as $R^a$ and $R^b$ in Formula (1), which are mentioned above, respectively, and examples (including preferable examples) thereof are also the same.

In Formula (1-L), Q represents a g-valent linking group having a water-soluble group. It is preferable that Q is a residue obtained by removing hydrogen atom(s) in a number of g from a hydrocarbon substituted with a water-soluble group. When Q is a residue obtained by removing hydrogen atom(s) in a number of g from a hydrocarbon substituted with a water-soluble group, the hydrocarbon may contain an ether group, an ester group, an amino group, an amide bond, a silyl ether group, a thiol group, or the like. The hydrocarbon preferably has 1 to 30 carbon atoms, and more preferably has 1 to 20 carbon atoms. The hydrocarbon is preferably an aromatic hydrocarbon, and examples thereof include benzene and naphthalene.

In Formula (1-L), g represents an integer of 2 to more, preferably an integer of 2 to 6, more preferably an integer of 2 to 4, further more preferably an integer of 2 to 3, and particularly preferably 2.

When the Component A is a low-molecular-weight compound having a molecular weight of from 300 to 2,000, Compounds (1-1) to (1-3) shown below may be preferably used in the invention.

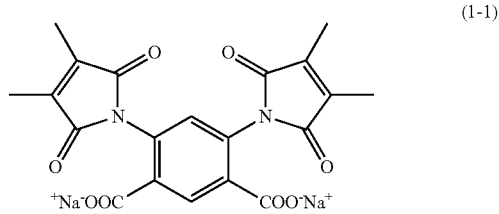

(1-1)

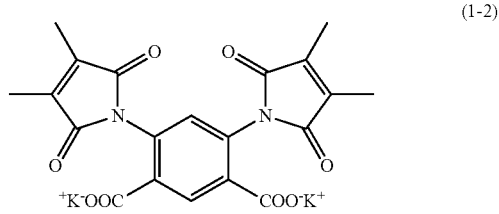

(1-2)

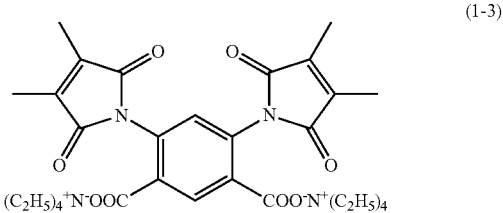

(1-3)

When the Component A is a high-molecular-weight compound having an average molecular weight of 5,000 or more, one molecule of Component A may contain at least two groups each represented by Formula (1) and a water-soluble group. The number of groups each represented by Formula (1) is not particularly limited, but is preferably from 2 to 500, and more preferably from 10 to 200. When the Component A is a high-molecular-weight compound, it is preferable that at least one of the groups each represented by Formula (1) is present at a side chain of the high-molecular-weight compound, and more preferable that at least two of the groups each represented by Formula (1) are present at one or more side chains of the high-molecular-weight compound.

From the viewpoints of ejection property and the like at the time of ejecting an ink composition by an inkjet method, the average molecular weight is preferably from 5,000 to 200,000, more preferably from 7,000 to 100,000, further more preferably from 10,000 to 50,000, and particularly preferably from 10,000 to 40,000.

The average molecular weight is measured by gel permeation chromatography (GPC). In the invention, the GPC measurement is carried out using HLC-8020GPC (trade name, manufactured by Tosoh Corporation) with TSK GEL SUPER HZM-H, TSK GEL SUPER HZ4000, and TSK GEL SUPER HZ200 (all trade names, manufactured by Tosoh Corporation; 4.6 mm ID×15 cm) as columns and tetrahydrofuran (THF) as an eluting solvent.

When the Component A is a high-molecular-weight compound having an average molecular weight of 5,000 to more, the polymer structure thereof is not limited as long as the Component A is a polymer compound having a group represented by Formula (1) at a side chain or at an end thereof. The polymer structure usable in the invention may be a polymer structure of polyacrylate, polyester, polyethyleneimine, polystyrene, or the like. From the viewpoints of ejection property of an ink composition by an inkjet method, solvent resistance and adhesiveness to a base material after the ink composition has been cured, and the like, the Component A preferably has a polyacrylate structure.

When the Component A is a polymer compound, it is preferably a polymer compound having a structure represented by following Formula (1').

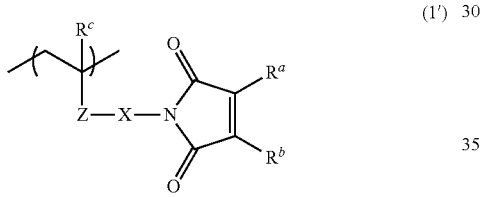

(1')

In Formula (1'), $R^a$ and $R^b$ each independently represent an alkyl group having 1 to 4 carbon atoms; $R^a$ and $R^b$ may be bonded to each other to form a 4-membered to 6-membered ring; $R^c$ represents a hydrogen atom or a methyl group; Z represents —COO— or —CONR$^d$—, in which $R^d$ represents a hydrogen atom or an alkyl group having 1 to 4 carbon atoms; and X represents a divalent organic group.

In Formula (1'), $R^a$ and $R^b$ each independently represent an alkyl group having 1 to 4 carbon atoms, and $R^a$ and $R^b$ may be bonded to each other to form a 4-membered to 6-membered ring. $R^a$ and $R^b$ in Formula (1') have the same definitions as $R^a$ and $R^b$ in Formula (1), which are mentioned above, respectively, and examples (including preferable examples) thereof are also the same.

In Formula (1'), $R^c$ represents a hydrogen atom or a methyl group, and preferably represents a methyl group.

In Formula (1'), Z represents —COO— or —CONR$^d$—, and preferably represents —COO—.

$R^d$ represents a hydrogen atom or an alkyl group having 1 to 4 carbon atoms. The alkyl group having 1 to 4 carbon atoms may have a linear structure or a branched structure. Specific examples thereof include a methyl group, an ethyl group, a propyl group, an isopropyl group, a butyl group, an isobutyl group, a sec-butyl group, and a t-butyl group. $R^d$ preferably represents a hydrogen atom or an alkyl group having 1 or 2 carbon atoms, i.e., a methyl group or an ethyl group, and particularly preferably represents a hydrogen atom. It should be noted that $R^d$ may be substituted or unsubstituted, but is preferably unsubstituted.

In Formula (1'), X represents a divalent organic group. The divalent organic group is preferably an alkylene group which has 2 to 20 carbon atoms and which may have a linear structure, a branched structure, or a cyclic structure. The alkylene group may contain an ether bond, an ester bond, an amide bond, a urethane bond, or an arylene group. When X represents an alkylene group, the alkylene group preferably has 2 to 20 carbon atoms, more preferably has 2 to 12 carbon atoms, and further more preferably has 2 to 8 carbon atoms.

In Formula (1'), it is preferably that $R^a$ and $R^b$ each independently represent an alkyl group having 1 or 2 carbon atoms, $R^c$ represents a methyl group, Z represents —COO—, and X represents an alkylene group having 2 to 12 carbon atoms.

When the Component A is a polymer compound having a structure represented by Formula (1') mentioned above, the polymer compound is preferably a polymer compound obtained by polymerizing a monomer represented by Formula (1'-1) shown below. Furthermore, it is more preferable that the polymer compound is a copolymer obtained by copolymerization of a monomer represented by Formula (1'-1) and a monomer having a water-soluble group. From the viewpoint of controlling the physical properties of a film of cured ink composition, it is preferable that another monomer (hereinafter, also refers to as additional monomer) is included as a copolymerization component.

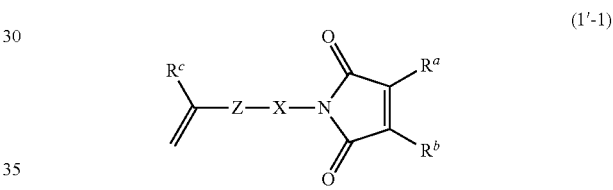

(1'-1)

$R^a$, $R^b$, R', Z, and X in Formula (1'-1) have the same definitions as those of Formula (1') mentioned above, respectively, and examples (including preferable examples) thereof are also the same.

Examples of preferable monomer represented by (1'-1) include following compounds (1-1-1) to (1-1-16), but the invention is not limited thereto.

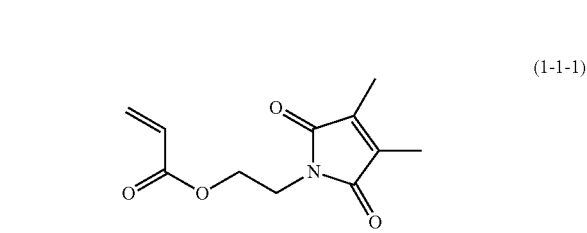

(1-1-1)

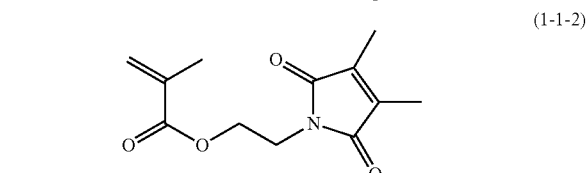

(1-1-2)

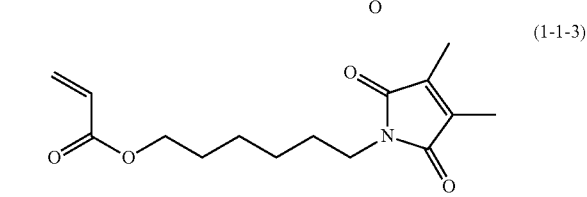

(1-1-3)

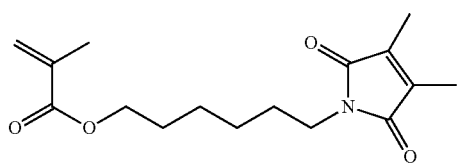
(1-1-4)

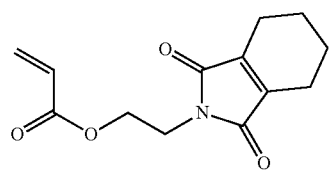
(1-1-5)

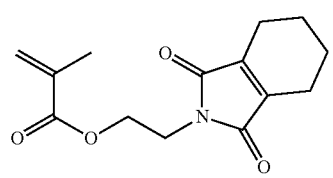
(1-1-6)

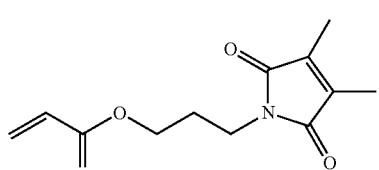
(1-1-7)

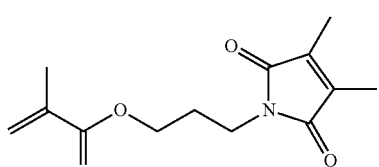
(1-1-8)

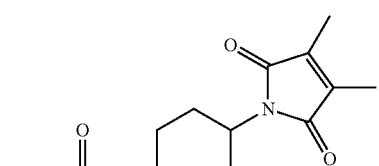
(1-1-9)

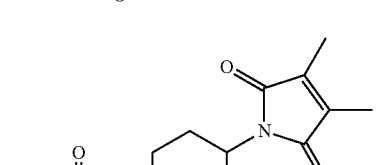
(1-1-10)

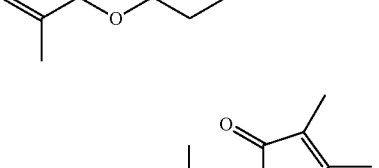
(1-1-11)

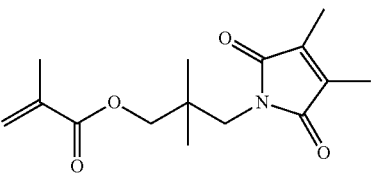
(1-1-12)

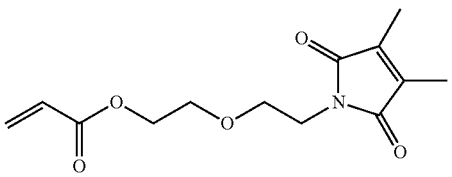
(1-1-13)

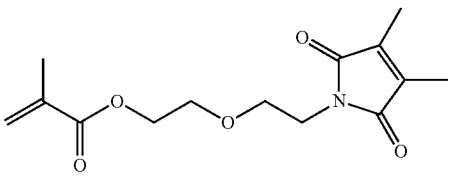
(1-1-14)

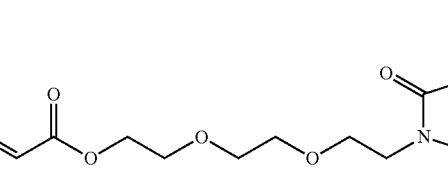
(1-1-15)

(1-1-16)

When the Component A is a polymer compound, the polymer compound preferably has a structure represented by following Formula (2), in addition to a structure represented by Formula (1').

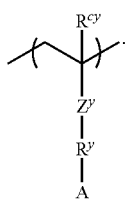

(2)

In Formula (2), $R^{cy}$ represents a hydrogen atom or a methyl group; $Z^y$ represents —COO—, —CONR$^{dy}$—, or a single bond, in which $R^{dy}$ represents a hydrogen atom or an alkyl group having 1 to 4 carbon atoms; $R^y$ represents a single bond or a divalent organic group; and A represents a water-soluble group.

In Formula (2), $R^{cy}$ represents a hydrogen atom or a methyl group, and preferably a hydrogen atom.

In Formula (2), $Z^y$ represents —COO—, —CONR$^{dy}$—, or a single bond, and preferably —COO—. $R^{dy}$ represents a hydrogen atom or an alkyl group having 1 to 4 carbon atoms, and the alkyl group having 1 to 4 carbon atoms may have a linear structure or a branched structure. Specific examples thereof include a methyl group, an ethyl group, a propyl group, an isopropyl group, a butyl group, an isobutyl group, a sec-butyl group, and t-butyl group. $R^{dy}$ is preferably a hydrogen atom or an alkyl group having 1 or 2 carbon atoms, i.e., a methyl group or an ethyl group, and particularly preferably a hydrogen atom. It should be note that $R^{dy}$ may be substituted or unsubstituted, but is preferably unsubstituted.

In Formula (2), $R^y$ represents a single bond or a divalent organic group. When $R^y$ is a divalent organic group, the divalent organic group is preferably a substituted or unsubstituted alkylene group having 1 to 20 carbon atoms, a substituted or unsubstituted arylene group having 6 to 20 carbon atoms, or a substituted or unsubstituted aralkylene group having 7 to 20 carbon atoms. These groups may each contain an ether bond, an ester bond, an amide bond, or a urethane bond.

When $R^y$ is an alkylene group having 1 to 20 carbon atoms, the alkylene group may have a linear structure, a branched structure, or a cyclic structure. When $R^y$ is an alkylene group, the alkylene group preferably has 2 to 12 carbon atoms, and more preferably has 2 to 8 carbon atoms. Specific examples of alkylene group represented by $R^y$ include —$CH_2$—, —$C_2H_4$—, —$C(CH_3)_2$—$CH_2$—, —$CH_2C(CH_3)_2CH_2$—, —$C_6H_{12}$—, $C_4H_7(C_4H_9)C_4H_8$—, $C_{18}H_{36}$, a 1,4-trans-cyclohexylene group, —$C_2H_4$—OCO—$C_2H_4$—, —$C_2H_4$—OCO—, —$C_2H_4$—O—$C_5H_{10}$—, —$CH_2$—O—$C_5H_9$($C_5H_{11}$)—, —$C_2H_4$—CONH—$C_2H_4$—, —$C_2H_4$—CONH—, —$C_4H_8$—OCONH—$C_6H_{12}$—, and —$CH_2$—OCONH$C_{10}H_{20}$—.

When $R^y$ is an arylene group having 6 to 20 carbon atoms, the arylene group preferably has 6 to 18 carbon atoms, more preferably has 6 to 14 carbon atoms, and most preferably has 6 to 10 carbon atoms. Specific examples of arylene group represented by $R^y$ include a phenylene group, a biphenylene group, —$C_6H_4$—CO—$C_6H_4$—, and a naphthylene group.

When $R^y$ is an aralkylene group having 7 to 20 carbon atoms, the aralkylene group preferably has 7 to 18 carbon atoms, more preferably has 7 to 14 carbon atoms, and most preferably has 7 to 10 carbon atoms. Specific examples of aralkylene group represented by $R^y$ include —$C_3H_6$—$C_6H_4$—, —$C_2H_4$—$C_6H_4$—$C_6H_4$—, —$CH_2$—$C_6H_4$—$C_6H_4$—$C_2H_4$—, and —$C_2H_4$—COO—$C_6H_4$.

In Formula (2), A represents a water-soluble group, preferably represents —$COOM^1$, —$SO_3M^1$, —$P(O)(OM^2)_2$, or —$OP(O)(OM^2)_2$, more preferably represents —$COOM^1$ or —$SO_3M^1$, and most preferably represents —$COOM^1$.

$M^1$ represents an alkali metal or an onium ion, and preferably an alkali metal. Specific examples of $M^1$ include a lithium atom, a sodium atom, a potassium atom, and an ammonium ion.

$M^2$ represents a hydrogen atom, an alkali metal, or an onium ion, and preferably a hydrogen atom. Specific examples of $M^2$ include a hydrogen atom, a lithium atom, a sodium atom, a potassium atom, and an ammonium ion.

It is preferable that A represents —$COOM^1$ or —$SO_3M^1$, in which $M^1$ represents an alkali metal, and more preferable that A represents —$COOM^1$, in which $M^1$ represents an alkali metal.

In Formula (2), it is preferable that $R^{cy}$ is a hydrogen atom, $Z^y$ is —COO—, $R^y$ is a single bond, an alkylene group having 2 to 8 carbon atoms, or an arylene group having 6 to 10 carbon atoms, and A is —$COOM^1$ or —$SO_3M^1$.

A structure represented by Formula (2) may be obtained by polymerization of a monomer represented by following Formula (2-1).

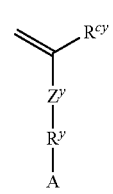

(2-1)

In Formula (2-1), $R^{cy}$, $Z^y$, $R^y$, and A have the same definitions as those in Formula (2), respectively, and preferable ranges thereof are also the same.

Preferable examples of monomer represented by Formula (2-1) include following compounds (2-1-1) to (2-1-15), but the invention is not limited thereto.

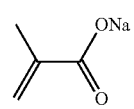

(2-1-1)

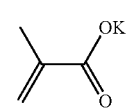

(2-1-2)

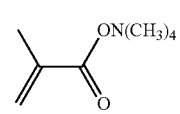

(2-1-3)

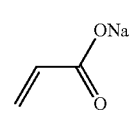

(2-1-4)

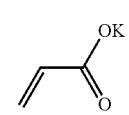

(2-1-5)

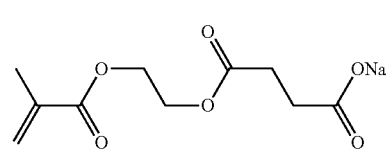

(2-1-6)

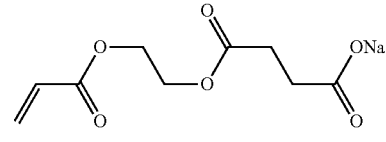

(2-1-7)

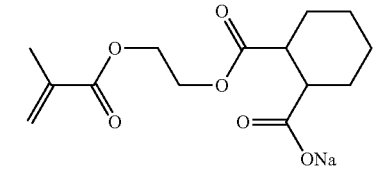

(2-1-8)

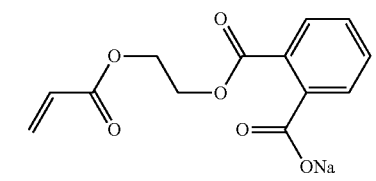

(2-1-9)

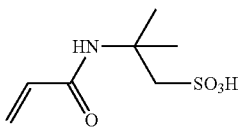

(2-1-10)

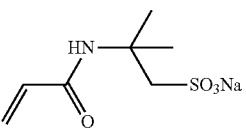

(2-1-11)

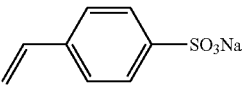

(2-1-12)

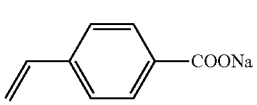

(2-1-13)

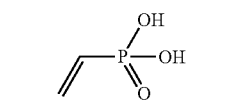

(2-1-14)

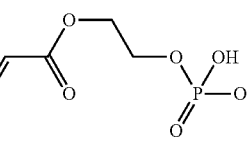

(2-1-15)

Examples of the additional monomers which are copolymerizable with a monomer represented by Formula (1'-1) and a monomer having a structure represented by Formula (2-1) include styrene, p-methoxystyrene, methyl (meth)acrylate, ethyl (meth)acrylate, allyl (meth)acrylate, butyl (meth)acrylate, hexyl (meth)acrylate, 2-ethylhexyl (meth)acrylate, octyl (meth)acrylate, decyl (meth)acrylate, stearyl (meth)acrylate, cyclohexyl(meth)acrylate, bornyl (meth)acrylate, isobornyl (meth)acrylate, benzyl (meth)acrylate, 2-ethylhexyl diglycol (meth)acrylate, butoxyethyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, butoxydiethylene glycol (meth)acrylate, trifluoroethyl (meth)acrylate, perfluorooctylethyl (meth)acrylate, 2-hydroxy-3-phenoxypropyl (meth)acrylate, (meth)acrylamide, N-butyl (meth)acrylamide, N-p-hydroxyphenyl (meth)acrylamide, and p-sulfamoylphenyl (meth)acrylamide. Preferable examples of monomers which are copolymerizable with a monomer represented by Formula (1'-1) include alkyl (meth)acrylates having about 1 to 8 carbon atoms, such as methyl (meth)acrylate, ethyl (meth)acrylate, butyl (meth)acrylate, hexyl (meth)acrylate, or 2-ethylhexyl (meth)acrylate. Any of known monomers other than mentioned above may be additionally used, is necessary.

When the Component A is a copolymer, it preferably has a structure represented by following Formula (A').

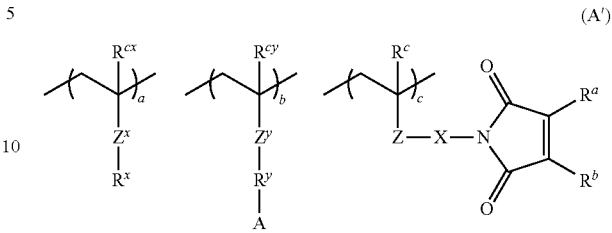

In Formula (A'), $R^{cx}$'s each independently represent a hydrogen atom or a methyl group; $Z^x$ represents —COO—, —CONR$_{dx}$—, or a single bond, in which $R^{dx}$ represents a hydrogen atom or an alkyl group having 1 to 4 carbon atoms; $R^x$ represents a hydrogen atom, an alkyl group having 1 to 10 carbon atoms, an aryl group having 6 to 20 carbon atoms, or an aralkyl group having 7 to 20 carbon atoms; and a, b, and c indicate copolymerization ratios in the polymer compound, and the sum of the numbers represented by a, b, and c is 100.

$R^a$, $R^b$, $R^c$, Z, and Z in Formula (A') have the same definitions as those of Formula (1'), respectively, and preferable ranges thereof are also the same.

$R^{cy}$, $Z^y$, $R^y$, and A in Formula (A') have the same definitions as those of Formula (2), respectively, and preferable ranges thereof are also the same.

In Formula (A'), $R^{cx}$'s each represents a hydrogen atom or a methyl group, and preferably a hydrogen atom.

In Formula (A'), $Z^x$ represents —COO—, —CONR$^{dx}$—, or a single bond, and preferably —COO—. $R^{dx}$ represents a hydrogen atom or an alkyl group having 1 to 4 carbon atoms. The alkyl group having 1 to 4 carbon atoms may have a linear structure or a branched structure. Specific examples thereof include a methyl group, an ethyl group, a propyl group, an isopropyl group, a butyl group, an isobutyl group, a sec-butyl group, and a t-butyl group. $R^{dx}$ is preferably a hydrogen atom or an alkyl group having 1 or 2 carbon atoms, i.e., a methyl group or an ethyl group, and particularly preferably a hydrogen atom. It should be noted that R" may be substituted or unsubstituted, but is preferably unsubstituted.

In Formula (A'), $R^x$ represents a hydrogen atom, an alkyl group having 1 to 10 carbon atoms, an aryl group having 6 to 20 carbon atoms, or an aralkyl group having 7 to 20 carbon atoms. These groups may each be substituted or unsubstituted, and may each contain an ether bond, an ester bond, an amide bond, or a urethane bond.

When $R^x$ is an alkyl group having 1 to 10 carbon atoms, the alkyl group may have a linear structure, a branched structure, or a cyclic structure. When $R^x$ is an alkyl group having 1 to 10 carbon atoms, the alkyl group preferably has 1 to 8 carbon atoms, and more preferably has 1 to 6 carbon atoms.

Specific examples of alkyl group having 1 to 10 carbon atoms represented by $R^x$ include —CH$_3$, —C$_2$H$_5$, —CH(CH$_3$)$_2$, —CH$_2$C(CH$_3$)$_3$, —C$_6$H$_{13}$, a cyclohexyl group, —C$_2$H$_4$—OCO—C$_2$H$_5$, —C$_2$H$_4$—O—C$_5$H$_{11}$, —C$_2$H$_4$—CONH—C$_2$H$_5$, and —C$_4$H$_8$—OCONH—C$_6$H$_{13}$.

When $R^x$ represents an aryl group having 6 to 20 carbon atoms, the aryl group has 6 to 20 carbon atoms, preferably 6 to 18 carbon atoms, further more preferably 6 to 14 carbon atoms, and most preferably 6 to 10 carbon atoms. Specific examples of aryl group represented by $R^x$ include a phenyl group, a biphenyl group, —C$_6$H$_4$—CO—C$_6$H$_5$, and a naphthyl group.

When $R^x$ represents an aralkyl group having 7 to 20 carbon atoms, the aralkyl group has 7 to 20 carbon atoms, preferably 7 to 18 carbon atoms, further more preferably 7 to 14 carbon atoms, and most preferably 7 to 10 carbon atoms. Specific examples of aralkyl group represented by $R^x$ include —$C_3H_6$—$C_6H_5$, —$C_2H_4$—$C_6H_4$—$C_6H_5$, —$CH_2$—$C_6H_4$—$C_6H_4$—$C_2H_5$, and —$C_2H_4$—OCO—$C_6H_5$.

In Formula (A'), a, b, and c indicate copolymerization ratios in a polymer compound, and the sum of the numbers represented by a, b, and c, respectively, is 100. It should be noted that the copolymerization ratios are in molar ratios. It is preferable that $30 \le a+b \le 90$ and $10 \le c \le 70$, and more preferable that $40 \le a+b \le 90$ and $10 \le c \le 60$.

In Formula (A'), it is preferable that $R^a$ and $R^b$ each independently represent an alkyl group having 1 or 2 carbon atoms; $R^c$ represents a methyl group; Z represents —COO—; X represents an alkylene group having 2 to 12 carbon atoms; $R^{cy}$ represents a hydrogen atom; $Z^y$ represents —COO—; $R^y$ represents a single bond, an alkylene group having 2 to 8 carbon atoms, or an arylene group having 6 to 10 carbon atoms; A represents —$COOM^1$ or —$SO_3M^1$; $R^{cx}$ represents a hydrogen atom; Zx represents —COO—; $R^x$ represent an alkyl group having 1 to 6 carbon atoms or an aryl group having 6 to 10 carbon atoms; and a, b, and c each independently represent a number that satisfies following expressions: $40 \le a+b \le 90$ and $10 \le c \le 60$.

Examples of Component A include following compounds (A-1) to (A-11), but the present invention is not limited thereto.

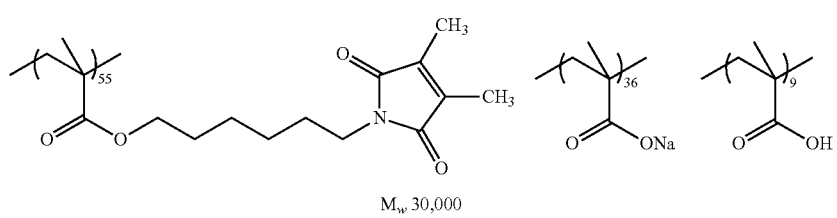

(A-1)

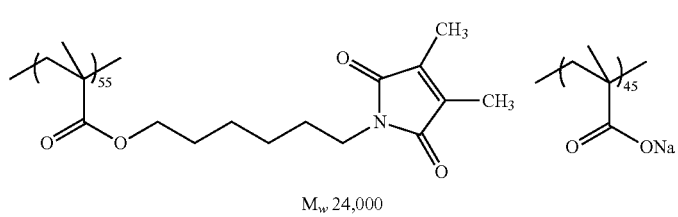

(A-2)

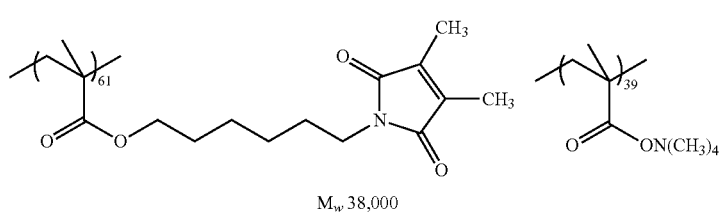

(A-3)

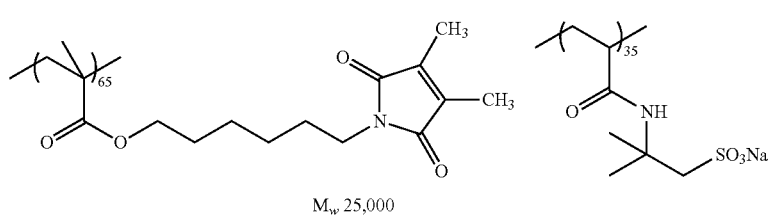

(A-4)

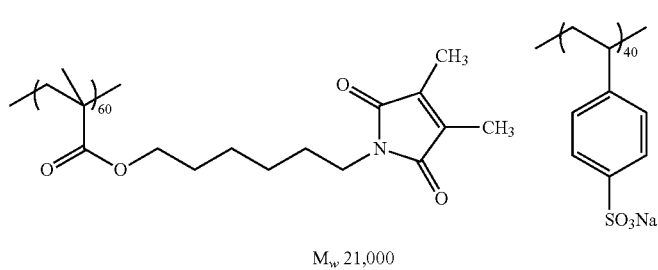

(A-5)

-continued

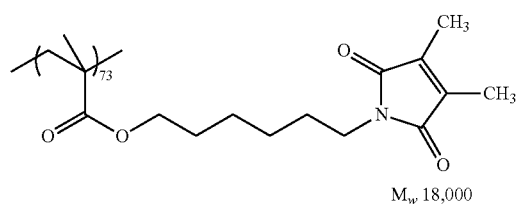
$M_w$ 18,000

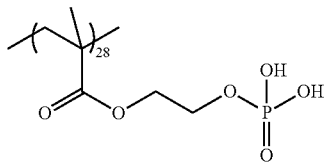
(A-6)

(A-7)
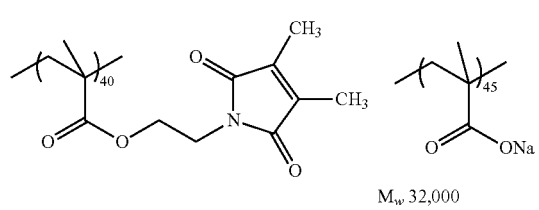
$M_w$ 32,000

(A-8)
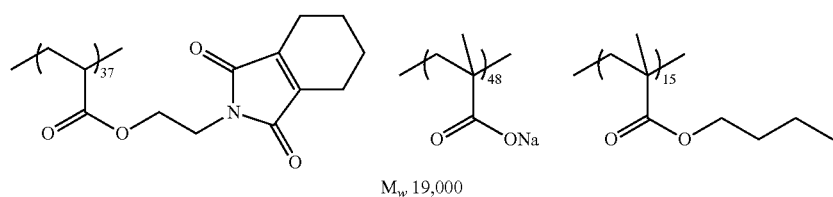
$M_w$ 19,000

(A-9)
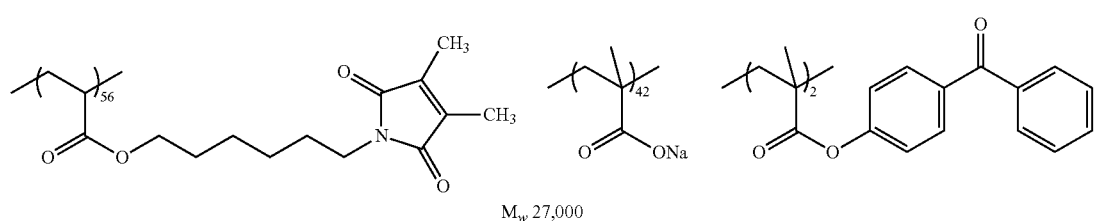
$M_w$ 27,000

(A-10)
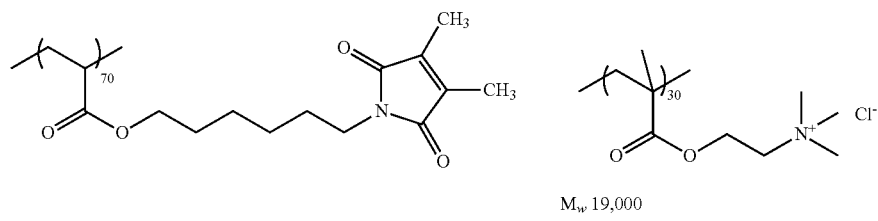
$M_w$ 19,000

(A-11)
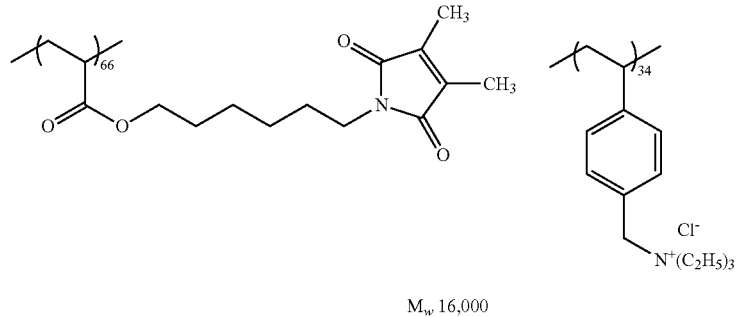
$M_w$ 16,000

In the invention, compounds (A-1) to (A-9) may be preferably used as the Component A, and compounds (A-1) to (A-3) and (A-7) to (A-9) are particularly preferable.

In general, the Component A used in the invention and precursors thereof may be produced by a known method. For example, a low-molecular-weight compound such as Exemplary Compound (1-1) to (1-3) may be produced in accordance with the methods disclosed in US Patent Application Publication No. 2009/0224203 A1, Synlett Vol. 13, pp. 2172-2176, 2009, Journal of Polymer Science Part A-1 Polymer Chemistry Vol. 10, 6, pp. 1687-1699, 1972, and the like. Acrylates usable as precursors of a polymer compound such as Exemplary Compounds (1-1-1) to (1-1-16) may be produced in accordance with the methods disclosed in Japanese Patent Application Laid-Open (JP-A) Nos. 52-988 and 4-251258, and the like. Compounds usable as precursors of a polymer compound such as Exemplary Compounds (2-1-1-) to (2-1-15) may be commercially available compounds, or may be compounds obtained by neutralizing an acid group of the commercially available compounds with a hydroxide or the like of an alkali metal. Polymer compounds such as Exemplary Compounds (A-1) to (A-11) may be obtained by polymerizing the above precursors by a known polymerization method, followed by, if necessary, neutralization of acid group thereof with a hydroxide or the like of an alkali metal. For example, such polymer compounds may be produced by a method in accordance with the polymerization methods disclosed in JP-A Nos. 52-988 and 55-154970, Langmuir Vol. 18, 14, pp. 5414-5421, 2002, and the like.

The content of Component A in the ink composition is preferably from 1 to 50% by mass, more preferably from 2 to 35% by mass, and further more preferably from 3 to 30% by mass. When the content of Component A is 1% by mass or more, favorable physical properties of a cured film may be obtained, and when the content is 50% by mass or less, ink viscosity may be maintained at an appropriate degree.

<(Component B) Colorant>

The ink composition of the invention further contains (Component B) a colorant.

The colorant usable in the invention is not particularly limited, and may be arbitrary selected from known colorants such as pigments, water-soluble dyes, and dispersive dyes. Of theses, the colorant preferably contains a pigment from the viewpoints that a pigment has excellent weatherability and excellent color reproducibility.

(Pigment)

The pigment is not particularly limited, and may be appropriately selected depending on the purpose. Examples of pigment include known organic pigments and inorganic pigments, and also include resin particles colored with a dye, and commercially available pigment dispersions and surface-treated pigments (e.g., pigments dispersed in a dispersion medium such as water, a liquid organic compound, or an insoluble resin, and pigments having surface treated with a resin, a pigment derivative, or the like). Examples of the pigment include those disclosed in Seijiro Ito, "Ganryo no Jiten", 2000, Asakura Publishing Co., Ltd., Isao Hashimoto "Yuki Ganryo Handbook", 2006, Color Office Co., Ltd., W. Herbst, K. Hunger "Industrial Organic Pigments", 1992, Wiley-VHC, JP-A No. 2002-12607, JP-A No. 2002-188025, JP-A No. 2003-26978, JP-A No. 2003-342503, JP-A No. 2009-235370, and the like.

Examples of organic pigments and inorganic pigments include yellow pigments, red pigments, magenta pigments, blue pigments, cyan pigments, green pigment, orange pigments, purple pigments, brown pigments, black pigments, and white pigments.

Examples of yellow pigments include: monoazo pigments such as C.I. Pigment Yellow 1, 2, 3, 4, 5, 10, 65, 73, 74, 75, 97, 98, 111, 116, 130, 167, or 205; monoazo lake pigments such as C.I. Pigment Yellow 61, 62, 100, 168, 169, 183, 191, 206, 209, or 212; disazo pigments such as C.I. Pigment Yellow 12, 13, 14, 16, 17, 55, 63, 77, 81, 83, 106, 124, 126, 127, 152, 155, 170, 172, 174, 176, 214, or 219; anthraquinone pigments such as C.I. Pigment Yellow 24, 99, 108, 193, or 199; monoazopyrazolone pigments such as C.I. Pigment Yellow 60; condensed azo pigments such as C.I. Pigment Yellow 93, 95, 128, or 166; isoindoline pigments such as 109, 110, 139, 173, or 185; benzimidazolone pigments such as C.I. Pigment Yellow 120, 151, 154, 175, 180, 181, or 194; azomethine metal complex pigments such as C.I. Pigment Yellow 117, 129, 150, or 153; quinophthalone pigments such as C.I. Pigment Yellow 138; and quinoxaline pigments such as C.I. Pigment Yellow 213.

Examples of red or magenta pigments include: monoazo lake pigments such as C.I. Pigment Red 193; disazo pigments such as C.I. Pigment Red 38; naphthol AS pigments such as C.I. Pigment Red 2, 5, 8, 9, 10, 11, 12, 14, 15, 16, 17, 18, 22, 23, 31, 32, 112, 114, 146, 147, 150, 170, 184, 187, 188, 210, 213, 238, 245, 253, 256, 258, 266, 268, or 269; β-naphthol pigments such as C.I. Pigment Red 3, 4, or 6; β-naphthol lake pigments such as C.I. Pigment Red 49, 53, or 68; naphthol AS lake pigments such as C.I. Pigment Red 237, 239, or 247; pyrazolone pigments such as C.I. Pigment Red 41; BONA lake pigments such as C.I. Pigment Red 48, 52, 57, 58, 63, 64:1, or 200; xanthene lake pigments such as C.I. Pigment Red 81:1, 169, or 172; thioindigo pigments such as C.I. Pigment Red 88, 181, or 279; perylene pigments such as C.I. Pigment Red 123, 149, 178, 179, 190, or 224; condensed azo pigments such as C.I. Pigment Red 144, 166, 214, 220, 221, 242, or 262; anthraquinone pigments such as C.I. Pigment Red 168, 177, 182, 226, or 263; anthraquinone lake pigments such as C.I. Pigment Red 83; benzimidazolone pigments such as C.I. Pigment Red 171, 175, 176, 185, or 208; quinacridon pigments such as C.I. Pigment Red 122, 202 (including a mixture thereof with C.I. Pigment Violet 19), 207, or 209; diketopyrrolopyrrole pigments such as C.I. Pigment Red 254, 255, 264, 270, or 272; and azomethine metal complex pigments such as C.I. Pigment Red 257 or 271.

Examples of blue or cyan pigments include: naphthol AS pigments such as C.I. Pigment Blue 25 or 26; phthalocyanine pigments such as C.I. Pigment Blue 15, 15:1, 15:2, 15:3, 15:4, 15:6, 16, 17:1, 75, or 79; dyeing lake pigments such as C.I. Pigment Blue 1, 24:1, 56, 61, or 62; anthraquinone pigments such as C.I. Pigment Blue 60; indigo pigments such as C.I. Pigment Blue 63; and dioxadine pigments such as C.I. Pigment Blue 80.

Examples of green pigments include dyeing lake pigments such as C.I. Pigment Green 1 or 4; phthalocyanine pigments such as C.I. Pigment Green 7 or 36; and azomethine metal complex pigments such as C.I. Pigment Green 8.

Examples of orange pigments include monoazo pigments such as C.I. Pigment Orange 1; β-naphthol pigments such as C.I. Pigment Orange 2, 3, or 5; naphthol AS pigments such as C.I. Pigment Orange 4, 24, 38, or 74; pyrazolone pigments such as C.I. Pigment Orange 13 or 34; benzimidazolone pigments such as C.I. Pigment Orange 36, 60, 62, 64, or 72; disazo pigments such as C.I. Pigment Orange 15 or 16; β-naphthol lake pigments such as C.I. Pigment Orange 17 or 46; naphthalene sulfonate lake pigments such as C.I. Pigment Orange 19; perinone pigments such as C.I. Pigment Orange 43; quinacridon pigments such as C.I. Pigment Orange 48 or 49; anthraquinone pigments such as C.I. Pigment Orange 51; isoindolinone pigments such as C.I. Pigment Orange 61; isoindoline pigments such as C.I. Pigment Orange 66; azomethine metal complex pigments such as C.I. Pigment Orange 68; and diketopyrrolopyrrole pigments such as C.I. Pigment Orange 71, 73, or 81.

Examples of brown pigments include: BONA lake pigments such as C.I. Pigment Brown 5; condensed azo pigments such as C.I. Pigment Brown 23, 41, or 42; and benzimidazolone pigments such as C.I. Pigment Brown 25 or 32.

Examples of purple pigments include: dyeing lake pigments such as C.I. Pigment Violet 1, 2, 3, or 27; naphthol AS pigments such as C.I. Pigment Violet 13, 17, 25, or 50; anthraquinone lake pigments such as C.I. Pigment Violet 5:1; quinacridon pigments such as C.I. Pigment Violet 19; dioxadine pigments such as C.I. Pigment Violet 23 or 37; perylene pigments such as C.I. Pigment Violet 29; benzimidazolone pigments such as C.I. Pigment Violet 32, and thioindigo pigments such as C.I. Pigment Violet 38.

Examples of black pigments include: indazine pigments such as C.I. Pigment Black 1; carbon black as C.I. Pigment Black 7; graphite as C.I. Pigment Black 10; magnetite as C.I. Pigment Black 11; anthraquinone pigments such as C.I. Pigment Black 20; and perylene pigments such as C.I. Pigment Black 31 or 32.

Examples of white pigments include: zinc oxide as C.I. Pigment White 4; titanium oxide as C.I. Pigment White 6; zinc sulfide as C.I. Pigment White 7; zirconium oxide (zirconium white) as C.I. Pigment White 12; calcium carbonate as C.I. Pigment White 18; aluminum oxide/silicon oxide (kaolin clay) as C.I. Pigment White 19; barium sulfate as C.I. Pigment White 21 or 22; aluminum hydroxide (alumina white) as C.I. Pigment White 23; silicon oxide as C.I. Pigment White 27; and calcium silicate as C.I. Pigment White 28.

Single species of inorganic particles may used as a white pigment, or an oxide, organic metal compound, or the like of silicon, aluminum, zirconium, titanium, or the like, or complex particles thereof with an organic compound may be used.

In particular, the titanium oxide is preferably used from the viewpoints that its specific gravity is relatively smaller than other white pigments, and it has relatively high refractive index, superior shielding property and coloring property, and excellent resistance against acid, alkali, and other environmental stress. The titanium oxide may be used in combination with other white pigments (including white pigments described above).

It is preferable to select the pigment, dispersing agent, or medium and set dispersion conditions and filtration conditions so as to make pigment particles have a volume average particle diameter of preferably from 0.005 µm to 0.5 µm, more preferably from 0.01 µm to 0.45 µm, and further more preferably from 0.015 µm to 0.4 µm. When the average particle diameter is within the above ranges, the effect of the invention may be further exerted.

In the invention, the average particle diameter and particle size distribution of particles may be determined by measuring a volume average particle diameter by dynamic light scattering method using a commercially available particle size analyzer such as a Nanotrac particle size analyzer UPA-EX150 (trade name, manufactured by Nikkiso Co., Ltd.).

(Water-Soluble Dye)

Examples of water-soluble dye usable in the invention include acid dyes and direct dyes. Acid dyes and direct dyes have structures containing an acid group as a solubilizing group. Examples of acid group include a sulfonic acid group and a salt thereof, a carboxylic acid group and a salt thereof, and a phosphoric acid group and a salt thereof. There may be only one acid group or plural acid groups, and a combination of different types of acid groups may be present. A chromophore included in a water-soluble dye may have a chemical structure of azo, phthalocyanine, triphenylmethane, xanthene, pyrazolone, nitro, stilbene, quinoline, methine, thiazole, quinoneimine, indigoid, rhodamine, anthraquinone, anthraquinone, or the like.

Specific examples of preferable water-soluble dye include, but not limited to, C.I. Acid Yellow 19, C.I. Acid Red 37, C.I. Acid Blue 62, C.I. Acid Orange 10, C.I. Acid Blue 83, C.I. Acid Black 01, C.I. Direct Yellow 44, C.I. Direct Yellow 142, C.I. Direct Yellow 12, C.I. Direct Blue 15, C.I. Direct Blue 25, C.I. Direct Blue 249, C.I. Direct Red 81, C.I. Direct Red 9, C.I. Direct Red 31, C.I. Direct Black 154, and C.I. Direct Black 17.

(Dispersive Dye)

In the invention, a dispersive dye may additionally used. Specific examples of preferable dispersive dye include C.I. Disperse Yellow 5, 42, 54, 64, 79, 82, 83, 93, 99, 100, 119, 122, 124, 126, 160, 184:1, 186, 198, 199, 201, 204, 224, and 237; C.I. Disperse Orange 13, 29, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1 and 9.

In the invention, only one type of colorant may be used, or a combination of two or more thereof may be used.

The content of Component B in the ink composition may be appropriately selected in accordance with the conditions such as physical properties of the colorant (e.g., specific gravity, coloring property, or color tone) and how many colors of ink composition are used in combination for producing a printed article. The content of Component B is preferably from 0.1 to 30% by mass, and more preferably from 0.5 to 20% by mass, with respect to the total mass of the ink composition.

(Dispersing Agent)

When a pigment is used as a colorant, a pigment dispersing agent may be used if necessary when pigment particles are prepared. Examples of pigment dispersing agent which may be used in the invention include surfactants such as higher fatty acid salts, alkyl sulfate salts, alkyl ester sulfate salts, alkyl sulfonate salts, sulfosuccinic acid salts, naphthalene sulfonate salts, alkyl phosphate salts, polyoxyalkylene alkyl ether phosphate salts, polyoxyalkylene alkyl phenyl ether, polyoxyethylene polyoxypropylene glycol, glycerin ester, sorbitan ester, polyoxyethylene fatty acid amide, or amine oxide; and block copolymers, random copolymers, and salts thereof formed from at least two types of monomers selected from the group consisting of styrene, a styrene derivative, a vinyl naphthalene derivative, acrylic acid, an acrylic acid derivative, maleic acid, a maleic acid derivative, itaconic acid, an itaconic acid derivative, fumaric acid, and a fumaric acid derivative.

The ink composition of the invention may further include a self-dispersive pigment. A "self-dispersive pigment" as used herein refers to a pigment capable of being dispersed without a dispersing agent, and is preferably a pigment particle having a polar group on a surface thereof.

A pigment particle having a polar group on a surface thereof (hereinbelow, may be referred to as "pigment derivative") as used in the invention refers to a pigment obtained by directly modifying a surface of a pigment particle with a polar group, or an organic compound having an organic pigment nucleus having a polar group which is directly bonded thereto or bonded thereto via a joint.

Examples of polar group include a sulfonic acid group, a carboxylic acid group, a phosphoric acid group, a boric acid group, and a hydroxyl group, and a sulfonic acid group and a carboxylic acid group are preferable, and a sulfonic acid group is more preferable.

As an example of a method of obtaining such a pigment particle having a polar group on the surface thereon, there is a method of oxidizing the surface of pigment particle using an appropriate oxidizing agent so as to introduce a polar group such as a sulfonic acid group or a salt thereof onto at least a part of the pigment surface, as disclosed in WO 97/48769, JP-A No. 10-110129, JP-A No. 11-246807, JP-A No. 11

57458, JP-A No. 11-189739, JP-A No. 11-323232, JP-A No. 2000-265094, or the like. Specifically, the pigment particle may be prepared by oxidizing carbon black using concentrated nitric acid, or, in a case of a color pigment, the pigment particle may be prepared by oxidizing it in sulfolane, N-methyl-2-pyrrolidone, or the like using sulfamic acid, sulfonated pyridine salt, amidosulfonic acid, or the like. If a water-soluble product is generated owing to excessive oxidization in any one of such reactions, the water-soluble product may be removed for purification, thereby obtaining a pigment dispersion. When a sulfonic acid group is introduced to the surface by oxidization, the acid group may be neutralized using a basic compound, if necessary.

Other examples of a method of obtaining a pigment particle having a polar group on the surface thereof include a method of adsorbing a pigment derivative onto a surface of a pigment particle by a treatment such as milling, as disclosed in JP-A No. 11-49974, JP-A No. 2000-273383, JP-A No. 2000-303014, or the like, and a method of dissolving a pigment and a pigment derivative in a solvent, followed by crystallization in a poor solvent, as disclosed in JP-A No. 200-277068, JP-A No. 2001-1495, JP-A No. 2001-234966, or the like. By any one of these methods, a pigment particle having a polar group at a surface thereon may be obtained.

A polar group present at a pigment surface may be a free group or may be in the form of a salt, or may have a counter salt. Examples of counter salt include inorganic salts (for example, inorganic salts thereof with lithium, sodium, potassium, magnesium, calcium, aluminum, nickel, ammonium, or the like) and organic salts (for example, organic salts thereof with triethylammonium, diethylammonium, pyridinium, triethanol ammonium, or the like), and a monovalent counter salt is preferable.

For a method of dispersing pigment, any one of various dispersing apparatus, such as a ball mill, a sand mill, an attritor, a roll mill, an agitator, a henschel mixer, a colloidal mill, an ultrasonic homogenizer, a pearl mill, a wet-type jet mill, or a paint shaker, may be used. Furthermore, it is preferable to use a centrifugal separator or a filter to remove coarse particles of pigment dispersion.

Regarding a preferable amount of dispersing agent added to an ink composition, it is preferable that the mass ratio D/P, in which P represents a mass of pigment in an ink composition and D represents a mass of a polymer dispersing agent in an ink composition, satisfies following equation: $0.01 \leq D/P \leq 2.0$, more preferably $0.03 \leq D/P \leq 1.5$, and further more preferably $0.05 \leq D/P \leq 0.6$. When the mass ratio is within the above ranges, aggregation and/or precipitation of pigment and increase in ink viscosity are inhibited, and as a result, an ink composition with excellent storage stability and excellent ejection stability due to a low viscosity of ink may be obtained.

When a dispersing treatment is carried out, a dispersing aid which is generally called a synergist (e.g., SOLSPERSE series such as SOLSPERSE 5000, 12000, or 22000 (all trade names, manufactured by The Lubrizol Corporation), and EFKA 6745 (trade name, manufactured by BASF Japan.)), and various surfactants and defoaming agents may preferably be added in addition to the dispersing agent, to increase dispersibility of pigment or wettability.

In the invention, when a pigment is dispersed, the dispersing treatment is preferably carried out by in such a manner that, after a pigment and a dispersing agent are mixed, the mixture is added in a polar organic solvent, followed by dispersing, or in such a manner that, after a polar organic solvent and a dispersing agent are mixed, a pigment is added to the mixture, followed by dispersing. For the dispersing treatment, any one of various dispersing apparatuses, such as a ball mill, a bead mill, a sand mill, a salt mill, an attritor, a roll mill, an agitator, a henschel mixer, a colloidal mill, an ultrasonic homogenizer, a pearl mill, a wet-type jet mill, or a paint shaker, may be used. In particular, a bead mill dispersing apparatus is preferable because of its excellent dispersing ability.

When bead mill dispersing is carried out, beads having a volume average particle diameter of preferably from 0.01 mm to 3.0 mm, more preferably from 0.05 mm to 1.5 mm, and further more preferably from 0.1 mm to 1.0 mm may be used to obtain a pigment dispersion having excellent stability.

<(Component C) Water>

The ink composition of the invention contains water as a main solvent.

Water is preferably ion-exchange water, distilled water, or the like, which does not substantially contain impurities.

The content of water in an ink composition of the invention is preferably from 10 to 97% by mass, more preferably from 30 to 95% by mass, and further more preferably from 35 to 93% by mass.

<Other Additives>

The ink composition of the invention may further contain a known additive in addition to the Component A to Component C which are essential components, as long as the effect of the invention is not impaired. Hereinbelow, additives which may be used in the ink composition are described.

<(Component D) Water-Miscible Organic Solvent>

The aqueous ink composition of the invention contains water as main solvent, and preferably further contains a water-miscible organic solvent as an additional solvent depending on the purpose.

As used herein, the water-miscible organic solvent refers to an organic solvent having a solubility in water at 25° C. of 10% by mass or more.

Examples of water-miscible organic solvent which may be used in the invention include following solvents:

Alcohols such as methanol, ethanol, propanol, isopropanol, butanol, isobutanol, secondary butanol, tertiary butanol, pentanol, hexanol, cyclohexanol, or benzyl alcohol;

polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, or 2-methylpropanediol;

polyhydric alcohol ethers such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, or propylene glycol monophenyl ether;

amines such as ethanolamine, diethanolamine, triethanolamine, N-methyl diethanolamine, N-ethyl diethanolamine, morpholine, N-ethylmorpholine, ethylenediamine, diethylenediamine, triethyleneteteramine, tetraethylene pentamine, polyethylene imine, pentamethyl diethylenetriamine, or tetramethyl propylenediamine;

amides such as formamide, N,N-dimethyl formamide, or N,N-dimethyl acetamide;

heterocyclic compounds such as 2-pyrrolidone, N-methyl-2-pyrrolidone, cyclohexylpyrrolidone, 2-oxazolidone, 1,3-dimethyl-2-imidazolidinone, or γ-butyrolactone;

sulfoxides such as dimethyl sulfoxide;

sulfones such as sulfolane; and other compounds such as urea, acetonitrile, or acetone.

The water-miscible organic solvent is preferably a polyhydric alcohol ether or a heterocyclic compound, and a combination thereof may be preferably used. Among polyhydric alcohol ethers, glycol ethers are preferable, and specifically, tripropylene glycol monomethyl ether, dipropylene glycol monomethyl ether, and dipropylene glycol dimethyl ether are preferable. Among heterocyclic compounds, 2-pyrrolidone, γ-butyrolactone, and the like are preferable, and 2-pyrrolidone is particularly preferable. In particular, a high-boiling solvent is preferable from the viewpoint of improvement in ejection property, and the high-boiling solvent has a boiling temperature at normal pressure of preferably 120° C. or more, and more preferably 150° C. or more.

Only one type of water-miscible organic solvents may be used, or a combination of two or more thereof may be used. A total amount of the water-miscible organic solvent added to an ink composition is from 1 to 60% by mass, and preferably from 2 to 35% by mass.

In the invention, an ink composition preferably contains a water-miscible organic solvent as the Component D in addition to the Component A, Component B, and Component C. It is preferable that the ink composition of the invention contains the Component A in a content of from 1 to 50%, the Component B in a content of from 0.1 to 30% by mass, the Component C in a content of from 10 to 97% by mass, and the Component D in a content of from 1 to 60% by mass; it is more preferably that the ink composition of the invention contains the Component A in a content of from 2 to 35% by mass, the Component B in a content of from 0.5 to 20% by mass, the Component C in a content of from 30 to 95% by mass, and the Component D in a content of from 2 to 40% by mass; and it is most preferable that the ink composition of the invention contains the Component A in a content of from 3 to 30% by mass, the Component B in a content of from 0.5 to 20% by mass, the Component C in a content of from 35 to 93% by mass, and the Component D in a content of from 2 to 35% by mass.

In the invention, when a water-miscible organic solvent is contained as the Component D, the content ratio (in mass ratio) between Component C and Component D, i.e., content ratio Component C:Component D, is preferably from 1:0.1 to 1:10, more preferably from 1:0.2 to 1:5, further more preferably from 1:0.2 to 1:2, and most preferably from 1:0.3 to 1:0.6.

(Surfactant)

The ink composition of the invention may additionally contain a surfactant. Examples of preferable surfactant include anionic surfactants such as dialkyl sulfosuccinates, alkyl naphthalene sulfonates, or fatty acid salts; nonionic surfactants such as polyoxyethylene alkyl ethers, polyoxyethylene alkyl allyl ethers, acetylene glycols, or polyoxyethylene-polyoxypropylene block copolymers; and cationic surfactants such as alkyl amine salts or quaternary ammonium salts. Among theses, an anionic surfactant and a nonionic surfactant are particularly preferably used.

In the invention, a polymer surfactant may be additionally used. From the viewpoint of ejection stability, any one of water-soluble resins mentioned below is preferably used as the polymer surfactant. Examples of water-soluble resins include styrene-acrylic acid-alkyl acrylate copolymers, styrene-acrylic acid copolymers, styrene-maleic acid-alkyl acrylate copolymers, styrene-maleic acid copolymers, styrene-methacrylic acid-alkyl acrylate copolymers, styrene-methacrylic acid copolymers, styrene-maleic acid half ester copolymers, vinylnaphthalene-acrylic acid copolymers, and vinylnaphthalene-maleic acid copolymers.

(Latex)

A latex may be added to the ink composition of the invention. Examples of latex which may be used in the invention include styrene-butadiene copolymers, polystyrene, acrylonitrile-butadiene copolymers, acrylic acid ester copolymers, polyurethane, silicone-acrylic copolymers, and acryl-modified fluorine resins. The latex may be a latex in which polymer particles are dispersed using an emulsifier, or may be a soap free latex in which polymer particles are dispersed without using an emulsifier. As the emulsifiers, a surfactant may be used, and it is preferable to use a polymer having a water-soluble group such as a sulfonic acid group or a carboxylic acid group, examples of which include a polymer having graft bonds of soluble groups, and a polymer obtained from a monomer having a soluble group and a monomer having an insoluble moiety.

The volume average particle diameter of polymer particles in a latex used in the ink composition of the invention is preferably from 10 nm to 300 nm, and more preferably from 10 nm to 100 nm. When the average particle diameter of a latex in the ink composition is within the above ranges, glossiness of an image is improved, and water resistance and scraping resistance are improved. The average particle diameter of polymer particles in latex may be measured using a commercially available particle diameter analyzer in accordance with light scattering method, electrophoresis, or a laser doppler method.

When a latex is used in the ink composition of the invention, the amount of latex added thereto is preferably from 0.1 to 20% by mass, and more preferably from 0.5 to 10% by mass, in terms of solid content. When a solid content amount of a latex is 0.1% by mass or more, an effect of improving water resistance may be exerted. When a solid content amount of a latex is 20% by mass or less, problems caused by the latex, such as increase in ink viscosity as time passes or increase in particle diameter of pigment dispersion, may be suppressed, and favorable ink storage stability may be obtained.

(Aqueous Polymer)

An aqueous polymer different from the Component A may be additionally added to the ink composition of the invention.

Natural polymers are a preferable example of the aqueous polymer. Specific examples thereof include proteins such as animal glue, gelatin, casein, or albumin; natural rubbers such as gum arabic or gum tragacanth; glucosides such as saponin; alginic acid and alginic acid derivatives such as propylene glycol alginate, triethanolamine alginate, or ammonium alginate; and cellulose derivatives such as methyl cellulose, carboxymethylcellulose, hydroxyethylcellulose, or ethylhydroxycellulose.

Other examples of preferable aqueous polymer include synthetic polymers. Examples thereof include acrylic resins such as polyvinyl alcohols, polyvinyl pyrrolidones, polyacrylic acids, acrylic acid-acrylonitrile copolymers, potassium acrylate-acrylonitrile copolymers, vinyl acetate-acrylic ester copolymers, or acrylic acid-acrylic acid ester copolymers; styrene acrylate resins such as styrene-acrylic acid copolymers, styrene-methacrylic acid copolymers, styrene-methacrylic acid-acrylic acid ester copolymers, styrene-α-methyl styrene-acrylic acid copolymers, or styrene-α-methyl styrene-acrylic acid-acrylic acid ester copolymers; styrene-maleic acid copolymers, styrene-maleic anhydride copolymers, vinyl naphthalene-acrylic acid copolymers, vinylnaphthalene-maleic acid copolymers, and vinyl acetate copolymers and salts thereof, such as vinyl acetate-ethylene copolymers, vinyl acetate-fatty acid vinyl ethylene copolymers, vinyl acetate-maleic acid ester copolymers, vinyl acetate-crotonic acid copolymers, vinyl acetate-acrylic acid copolymers. Of these, polyvinyl pyrrolidones are particularly preferable.

The aqueous polymer which may be used in the invention has a molecular weight of preferably from 1,000 to 200,000, and more preferably from 3,000 to 20,000. When the molecular weight is less than 1,000, an effect of suppressing growth and aggregation of pigment particles may be deteriorated, and when the molecular weight exceeds 200,000, problems such as viscosity increase or poor solubility tend to arise.

The amount of aqueous polymer to be added is preferably from 10 to 1,000% by mass, and more preferably from 50 to 200% by mass, with respect to dissolved pigment. When the amount is less than 10% by mass, an effect of suppressing growth and aggregation of pigment particles may be deteriorated, and when the amount exceeds 1,000% by mass, problems such as viscosity increase or poor solubility tend to arise.

(Polymerization Initiator)

The aqueous ink composition of the invention may further include a polymerization initiator as long as the effect of the invention is not impaired. The polymerization initiator is preferably water soluble. Regarding the degree of water solubility, it is preferable that the polymerization initiator has a solubility in distilled water at 25° C. in an amount of 0.5% by mass or more, more preferably in an amount of 1% by mass or more, and particularly, preferably in an amount of 3% by mass or more.

It is preferable to use a polymerization initiator selected from the group consisting of α-aminoketones and acylphosphine oxides.

Examples of compounds encompassed in α-aminoketones include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)-butanone-1. Furthermore, such compounds are available as commercial products as IRGACURE series (trade name, manufactured by Ciba Geigy) such as IRGACURE 907, IRGACURE 369, or IRGACURE 379. These products are compounds encompassed in α-aminoketones, and may be preferably used in the invention.

Examples of compounds encompassed in acylphosphine oxides include [2,4,6-trimethylbenzoyl-diphenyl-phosphineoxide] which is available under a product name of DAROCUR TPO (trade name, manufactured by BASF Japan.), and [bis(2,4,6-trimethylbenzoyl)-phenylphosphineoxide] which is available under a product name of IRGACURE 819 (trade name, manufactured by BASF Japan.).

Although the acylphosphine oxides are preferably used as a polymerization initiator, other polymerization initiator may be used in the aqueous ink composition of the invention, as long as the effect of the invention is not impaired. Alternatively, other polymerization initiator may be used in combination with an acylphosphine oxide. In this case, a water-soluble polymerization initiator is preferably used. As used in this context, water solubility means that a polymerization initiator dissolves in distilled water at 25° C. in an amount of preferably 0.5% by mass or more, more preferably 1% by mass or more, and particularly preferably 3% by mass or more.

Examples of other known polymerization initiators include camphorquinone, benzophenone, benzophenone derivatives, acetophenone, acetophenone derivatives, such as α-hydroxy-cycloalkyl phenyl ketones or 2-hydroxy-2-methyl-1-phenyl-propanone, dialkoxyacetophenones, α-hydroxy- or 4-aloyl-1,3-dioxolanes, benzoin alkyl ethers, and benzyl ketals such as benzyldimethyl ketal, glyoxalic acid phenyl and derivatives thereof, glyoxalic acid phenyl dimers, peresters such as benzophenone tetracarboxylic acid peresters (e.g., those disclosed in EP 1126541), halomethyl triazines such as 2-[2-(4-methoxy-phenyl)-vinyl]-4,6-bis-trichloromethyl[1,3,5]triazine, 2-(4-methoxy-phenyl)-4,6-bis-trichloromethyl[1,3,5]triazine, 2-(3,4-dimethoxy-phenyl)-4,6-bis-trichloromethyl[1,3,5]triazine, 2-methyl-4,6-bis-trichloromethyl[1,3,5]triazine, hexaarylbisimidazole/co-initiator, for example, a combination of 2-mercaptobenzothiazole and ortho-chloro-hexaphenyl-bisimidazole; ferrocenium compounds and titanocenes, for example, dicyclopentadienyl-bis(2,6-difluoro-3-pyrrolo-phenyl)titanium and a mixture with an O-acyloxime ester compound as disclosed in GB 2,339,571. As a co-initiator, a boric acid compound may be used.

The content of polymerization initiator in the aqueous ink composition of the invention is preferably from 0 to 10 parts by mass, more preferably from 0 to 5 parts by mass, and further more preferably from 0 to 3 parts by mass, with respect to 100 parts by mass of ink composition. It should be noted that a content of polymerization initiator is a total content of polymerization initiator(s).

(Sensitizing Dye)

In the invention, a known sensitizing dye may be additionally used, and it is preferable to use a sensitizing dye from the viewpoint of improving a curing property at the time of active energy ray application. Regarding the solubility of a sensitizing dye, it is preferable that a sensitizing dye dissolves in distilled water at room temperature in an amount of 0.5% by mass or more, more preferably 1% by mass or more, and particularly preferably 3% by mass or more.

Examples of known sensitizing agent which may be used include benzophenone, thioxanthone, and especially, isopropyl thioxanthone, anthraquinone and 3-acylcoumarine derivatives, terphenyl, styrylketone and 3-(aroylmethylene) thiazoline, camphorquinone, eosin, rhodamine, and erythrosine. A compound represented by formula (1) disclosed in JP-A No. 2010-24276, a compound represented by formula (1) disclosed in JP-A No. 6-107718, or the like may preferably be used.

(Polymerizable Compound)

The aqueous ink composition of the invention may contain a polymerizable compound. The polymerizable compound may be any compound as long as it is a water-soluble compound having at least one radical-polymerizable ethylenic unsaturated bond in a molecule thereof, and may be in the chemical form of a monomer, an oligomer, a polymer, or the like. Only one type of specific polymerizable compounds may be used, or a combination of two or more thereof in arbitrary proportions may be used for improving an intended property. It is preferable to use a combination of two or more thereof from the viewpoints of controlling properties such as reactivity or physical property.

The polymerizable compound used in the invention is a compound that is soluble in distilled water at room temperature in an amount of 2% by mass or more, and preferably 15% by mass or more, and it is particularly preferable that the polymerizable compound uniformly mixed with water at an arbitrary ratio.

Examples of polymerizable compound include unsaturated carboxylic acids, such as acrylic acid, methacrylic acid, itaconic acid, crotonic acid, isocrotonic acid, or maleic acid, and esters thereof, and salts thereof, an anhydride having an ethylenic unsaturated group, acrylonitrile, styrene, and various unsaturated polyesters, unsaturated polyethers, unsaturated polyamides, unsaturated urethanes, vinyl ethers, and allyl ethers. In particular, acrylic acid and methacrylic acid, and esters and salts thereof are preferable.

To impart water solubility to the polymerizable compound which may be used in the invention, the polymerizable compound preferably has a poly(ethyleneoxy) chain, a poly(propyleneoxy) chain, or an ionic group such as a carboxyl group or a sulfo group. When a poly(ethyleneoxy) chain or a poly (propyleneoxy) chain is included, the number of units of ethyleneoxy or propyleneoxy is preferably from 1 to 10, and more preferably from 1 to 5. When the chain is too long, hardness, adhesiveness to a recording medium, or the like of a cured film may be insufficient though water solubility is achieved.

In order to further improve sensitivity, ameliorate bleeding, and improve adhesiveness to a recording medium, it is preferable that a combination of a monoacrylate with a polyfunctional acrylate monomer or oligomer having a molecular weight of 400 or more, and preferably 500 or more is used as a radical polymerizable compound. In particular, when an ink composition is used for recording to a flexible/soft recording medium such as a PET film or a PP film, a combination of a monoacrylate selected from the compounds mentioned above and a polyfunctional acrylate monomer or oligomer is preferable because it imparts flexibility of an obtained film and improves adhesiveness thereof while the film strength is increased.

Furthermore, an embodiment in which a combination of at least three polymerizable compounds of a monofunctional monomer, a bifunctional monomer, and trifunctional or higher-functional monomer is used is preferable from the viewpoints that sensitivity, bleeding, and adhesiveness to a recording medium are further improved while safety is maintained.

If necessary, for the purpose of improving properties such as ejection stability, compatibility with a print head or ink cartridge, storage stability, or image preservability, the ink according to the invention may contain, in addition to the above mentioned constitutional components, any one of various known additives selected from a viscosity controller, a surface tension controller, a specific resistance controller, a film-forming agent, a dispersing agent, a surfactant, an ultraviolet absorber, an antioxidant, an anti-decoloration agent, a fungicide, a corrosion preventing agent, a solid humectant, silica fine particles, and the like. Examples thereof include liquid paraffin, dioctyl phthalate, tricresyl phosphate, oil droplet particles of silicone oil or the like, an ultraviolet absorber as disclosed in JP-A Nos. 57-74193, 57-87988, and 62-261476, a anti-decoloration agent as disclosed in JP-A Nos. 57-74192, 57-87989, 60-72785, 61-146591, 1-95091, and 3-13376, a fluorescent bleaching agent as disclosed in JP-A Nos. 59-42993, 59-52689, 62-280069, 61-242871, and 4-219266, and a pH controller such as sulfuric acid, phosphoric acid, citric acid, sodium hydroxide, potassium hydroxide, or potassium carbonate.

<Method of Producing Ink Composition>

A method of producing the ink composition of the invention is not particularly limited, and the ink composition may be prepared by stirring, mixing, and dispersing respective components using a container-driven medium mill such as a ball mill, a centrifugal mill, or a planetary balls mill, a high-speed rotary mill such as a sand mill, a medium agitating mill such as such as a mixing vessel-type mill, or a simple dispersion apparatus such as a disper. The order of addition of respective components is arbitrary. It is preferably that an azo pigment represented by Formula (1) is pre-mixed with a polymer dispersing agent and an organic solvent, and, after that, the mixture is subjected to a dispersion treatment, followed by mixing of the obtained dispersion with a resin (such as an anionic resin) and an organic solvent. In this case, at the time of addition or after addition, the components are uniformly mixed using a simple stirring apparatus such as a three-one motor, a magnetic stirrer, a disper, or a homogenizer. Alternatively, a mixing apparatus such as a line mixer may be used for mixing. In order for ultra-fining of dispersed particles, a dispersing apparatus such as a bead mill or a high-pressure jet mill may be used for mixing. Depending on the type of pigment, polymer dispersing agent, or the like, an anionic resin may be added at the time of pre-mixing carried out before a pigment dispersing treatment.

The ink composition of the invention preferably has a surface tension at 25° C. of from 20 to 40 mN/m. The surface tension may be measured under conditions of 25° C. using an automatic surface tensiometer CBVP-Z (trade name, manufactured by Kyowa Interface Science Co., Ltd.). The viscosity is preferably from 1 to 40 mPa·s, and more preferably from 3 to 30 mPa·s. The viscosity may be measured under conditions of 25° C. using a viscometer TV-22 (trade name, manufactured by Toki Sangho Co., Ltd.).

<Inkjet Recording Method>

An inkjet recording method of the invention includes a process of applying the ink composition to a recording medium (i.e., ink application process), and a process of irradiating the ink composition with active energy radiation (i.e., irradiation process). By performing these processes, an image is formed from the ink composition fixed on a recording medium.

(Ink Application Process)

Hereinbelow, the ink application process in the inkjet recording method of the invention is described. The ink application process is not restricted as long as it is a process of applying the ink composition to a recording medium.

An inkjet recording apparatus used in the inkjet recording method of the invention is not particularly limited, and may be arbitrary selected from known inkjet recording apparatuses capable of providing an intended resolution. In other words, any one of known inkjet recording apparatuses including commercially available products enables ejection of the ink composition to a recording medium in the inkjet recording method of the invention.

An example of inkjet recording apparatuses which may be used in the invention is an apparatus having at least an ink supply system, a temperature sensor, and a heating device.

The ink supply system has, for example, a base tank, a supply pipe, an ink supply tank that is arrange at a position adjacent to an inkjet head, a filter, and a piezo-type inkjet head. The piezo-type inkjet head is capable of moving and ejecting multi-sized dots of preferably 1 to 100 µl, and more preferably 8 to 30 µl, at a resolution of preferably 320×320 dpi to 4000×4000 dpi, more preferably 400×400 dpi to 1600×1600 dpi, and further more preferably 720×720 dpi. Herein, "dpi" as used in the invention indicates the number of dots per 2.54 cm.

Since it is desirable to keep the ink composition to be ejected at a certain temperature, it is preferable that the inkjet recording apparatus has a temperature stabilizing device that stabilizes the temperature of the ink composition. The temperature of all of pipe systems and members of the inkjet recording apparatus, including the parts thereof from the ink tank (and an intermediate tank, if present) to a nozzle ejection surface, is maintained at a certain level. In other words, the parts from the ink supply tank to the inkjet head may be thermally insulated and/or heated.

The method of controlling temperature is not particularly limited. For example, it is preferable to place temperature sensors at plural positions on respective pipes, and control the heating in accordance with the ink flow rate and environment temperature, for example. A temperature sensor may be placed at a position adjacent to an ink supply tank and a nozzle of an inkjet head. Furthermore, it is preferable that the head unit to be heated is thermally shielded or insulated so as not to be affected by the outside temperature of the apparatus body. In order to reduce the printer start-up time necessary for heating, or to reduce the loss in thermal energy, it is preferable to reduce the thermal capacity of the entire heating unit, simultaneously with thermal insulation from other parts.

The ejection of the ink composition of the invention using the inkjet recording apparatus is preferably carried out after the viscosity of the ink composition is decreased to preferably from 3 to 15 mPa·s, and more preferably from 3 to 13 mPa·s by heating the ink composition to preferably 25 to 80° C., and more preferably from 25 to 50° C. In particular, it is preferable to use the ink composition of the invention having an ink viscosity at 25° C. of 50 mPa·s or less, because ink ejection is favorably carried out. By using this method, a high ejection stability is achieved.

The ink viscosity fluctuation significantly affects the changes in droplet size and droplet ejection speed, leading to image deterioration. Therefore, the temperature of the ink composition upon ejection is preferably maintained at a certain temperature as well as possible. Accordingly, in the invention, it is appropriate to control the ink temperature within a range ±5° C. of a set temperature, preferably within a range ±2° C. of a set temperature, and more preferably within a range ±1° C. of a set temperature.

In the invention, a recording medium is not particularly limited, and any one of recording media known as supports or recording materials. Examples of recording medium include paper, paper laminated with plastic (such as polyethylene, polypropylene, or polystyrene), metal plates (which are made from aluminum, zinc, copper, or the like), plastic films (which are made from a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, or the like), and a paper sheet or plastic film having the metal mentioned above laminated or deposited thereon. Specifically, since the ink composition of the invention has an excellent adhesiveness, it may be preferably used for a non-absorbable recording medium as the recording medium. From the viewpoints of adhesiveness, a plastic base material made from polyvinyl chloride, polyethylene terephthalate, polyethylene, or the like is preferable, a polyvinyl chloride resin base material is more preferable, and a polyvinyl chloride resin sheet or film is further more preferable.

(Irradiation Process)

Hereinbelow, the irradiation process in the inkjet recording method of the invention is described. The irradiation process in the invention is not particularly limited, as long as it includes irradiating the ink composition which has been applied to the recording medium with active energy radiation. By applying an active energy ray to the ink composition of the invention, cross-linking reaction of compounds in the ink composition is promoted, which results in fixation of image and improvement in solvent resistance of a printed article. By the irradiation process, cross-linking reaction of Component A proceeds, and a cross-linked structure represented by following Formula (5) is formed in the ink composition.

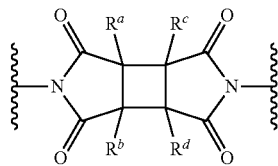

(5)

In Formula (5), $R^a$, $R^b$, $R^c$, and $R^d$ each independently represent an alkyl group having 1 to 4 carbon atoms; $R^a$ and $R^b$ may be bonded to each other to form a 4-membered to 6-membered ring; and $R^c$ and $R^d$ may be bonded to each other to form a 4-membered to 6-membered ring. $R^a$ and $R^b$ have the same definitions as those of Formula (1), respectively, and the preferable ranges thereof are also the same. $R^c$ has the same definition as $R^a$ of Formula (1), and the preferable range thereof is also the same. $R^d$ has the same definition as $R^b$ of Formula (1), and the preferable range thereof is also the same.

Examples of active energy ray which may be used in the irradiation process include an ultraviolet ray (hereinbelow, may be referred to as "UV light"), a visible ray, and an electron beam, and UV light is preferably used.

Although it depends on the absorption property of a sensitizing dye optionally used, the peak wavelength of UV light is, for example, preferably from 200 nm to 405 nm, more preferably from 250 nm to 405 nm, and further more preferably from 250 nm to 390 nm.

The power output of UV light is preferably 2,000 mJ/cm² or less, more preferably from 10 to 2,000 mJ/cm², further more preferably from 20 to 1,000 mJ/cm², and particularly preferably from 50 to 800 mJ/cm².

When UV light is used, it is preferable to apply UV light at an illuminance at the exposure surface of from 10 to 2,000 mW/cm², and preferably from 20 to 1,000 mW/cm².

As a UV light source, a mercury lump, a gas laser, a solid laser, or the like is mainly used. Furthermore, a mercury lump and a metal halide lump are widely known. Meanwhile, shift for GaN semiconductor ultraviolet-emitting devices is extremely useful from industrial and environmental viewpoints. Furthermore, LEDs (UV-LEDs) and LDs (UV-LDs) have been expected for serving as a photocurable inkjet light source because they have small sizes and long life, while being highly efficient and inexpensive.

The ink composition of the invention is irradiated with such UV light for 0.01 second to 120 seconds, and preferably for 0.1 second to 90 seconds.

Irradiation conditions and basic irradiation method are disclosed in JP-A No. 60-132767. Specifically, a method in which light sources are arranged at both sides of a head unit including the ink ejection device, and the head unit and light sources are moved in a so-called shuttle manner, is preferable, or a method in which another light source is used without movement thereof may be preferable. The application of an active energy ray is carried out after a certain time passed (for example, 0.01 to 60 seconds, preferably 0.01 to 30 seconds, and more preferably 0.01 to 15 seconds) after the ink impaction.

(Heat Drying Process)

It is preferable that the ink composition applied on a recording medium is fixed thereon by evaporating the Component C, and, if present, a water-miscible organic solvent optionally used if necessary, using a heating device. In the following, a process of heating and fixing the ejected ink composition of the invention. This process of drying by heating is herein referred to as "heat drying process".

The heating device is not limited as long as it is capable of drying the Component C and an optional water-miscible organic solvent. Examples thereof include a heat drum, hot air, an infrared lump, a heat oven, and a heating plate.

The heating temperature is not particularly limited as long as the Component C and an optional water-miscible organic solvent, which are present in the ink composition, evaporate, and a film of the Component A and a polymer binder optionally added if necessary is formed. When the heating temperature is 40° C. or more, these effects are achieved, and the heating temperature is preferably from about 40 to 150° C., and more preferably from about 40 to 80° C. When the heating temperature exceed about 100° C., a recording medium may deform or the like, which results in inconvenience in conveyance thereof.

The time for drying and/or heating is not particularly limited as long as the Component C and an optional water-miscible organic solvent, which are present in the ink composition, evaporate, and a film is formed from the resin agent, and may be appropriately set depending on the composition of the ink composition to be used and/or printing speed.

The solvent-type ink composition fixed by heating may be irradiated with UV light for optical fixation, if necessary. In order to improve strength, water resistance, and solvent resistance of a printed article, it is preferable to conduct optical fixation using UV light.

<Inkjet Printed Article>

The inkjet printed article of the invention is obtained by recording by the inkjet recording method of the invention. Since the inkjet printing article of the invention is a printed article having an image printed thereon by the inkjet recording method of the invention, the image recorded on the inkjet printing article has excellent solvent resistance and excellent adhesiveness to a base material.

Hereinbelow, exemplary embodiments of the invention are described.

<1> An aqueous ink composition, including:
(Component A) a compound having a water-soluble group and at least two groups each represented by following Formula (1);
(Component B) a colorant; and
(Component C) water:

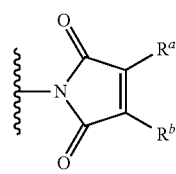

(1)

wherein, in Formula (1), $R^a$ and $R^b$ each independently represent an alkyl group having 1 to 4 carbon atoms; and $R^a$ and $R^b$ may be bonded to each other to form a 4-membered to 6-membered ring.

<2> The aqueous ink composition according to <1>, wherein the water-soluble group is at least one group selected from the group consisting of an alkali metal salt and an onium salt of carboxylic acid, an alkali metal salt and an onium salt of sulfonic acid, phosphoric acid, an alkali metal salt and an onium salt of phosphoric acid, phosphonic acid, an alkali metal salt and an onium salt of phosphonic acid, and a quaternary ammonium salt.

<3> The aqueous ink composition according to <1> or <2>, wherein the (Component A) is a polymer compound having the groups each presented by Formula (1) at one or more side chains.

<4> The aqueous ink composition according to any one of <1> to <3>, further including (Component D) a water-miscible organic solvent.

<5> An inkjet recording method, including an ink application process of applying the aqueous ink according to any one of <1> to <4> onto a recording medium, an irradiation process of irradiating the applied ink composition with active energy radiation, and drying by heating the applied ink composition.

<6> An inkjet printed article, having an image recorded by the inkjet recording method according to <5>.

EXAMPLES

Hereinbelow, the invention is described in more detail, but the invention is not limited to these examples. It should be noted that "part" and "%" are in terms of mass unless otherwise noted.

Materials of pigment dispersions and ink compositions used in Examples and Comparative Examples are described below.

<Synthesis of Polymer Dispersing Agent D-1>

To a 500 ml-volume three-necked flask equipped with a stirrer and a condenser, 44 g of methyl ethyl ketone was added and heated to 72° C. under a nitrogen atmosphere. To this flask, a solution obtained by dissolving 0.43 g of dimethyl 2,2'-azobisisobutyrate, 30 g of benzyl methacrylate, 5 g of methacrylic acid, and 15 g of methyl methacrylate in 25 g of methyl ethyl ketone was added dropwise over 3 hours. After completion of dropping, the mixture was left stand for reaction for 1 hour, and a solution obtained by dissolving 0.21 g of dimethyl 2,2'-azobisisobutyrate in 1 g of methyl ethyl ketone was added thereto, followed by heating at 78° C. for 4 hours. The resultant reaction solution was subjected to re-precipitation twice using an excess amount of hexane, and a precipitated resin was dried, to thereby obtain 43 g of Polymer dispersing agent D-1.

The composition of the obtained resin was confirmed by $^1$H-NMR, and the weight average molecular weight (Mw) thereof measured by GPC was 42,000. Furthermore, an acid value thereof was measured by a method in accordance with a general test method for acid value (e.g., JIS K0070 (1992)), and was found to be 65.4 mgKOH/g.

<Preparation of Dispersion of Resin-Coated Pigment>
(Resin-Coated Cyan Pigment Dispersion)

First, 10 parts of Pigment Blue 15:3 (PHTHALOCYANINE BLUE A220, trade name, manufactured by Dainichiseika Color & Chemicals Mfg. Co., Ltd.), 5 parts of Polymer dispersion D-1 mentioned above, 42 parts of methyl ethyl ketone, 5.5 parts of 1 mol/L NaOH aqueous solution, and 87.2 parts of ion-exchange water were mixed, and subjected to a dispersion treatment using a bead mill with 0.1 mmϕ zirconia beads for 2 to 6 hours.

Methyl ethyl ketone was removed from the obtained dispersion under reduced pressure at 55° C., and part of water was also removed, to thereby obtain a resin-coated cyan pigment dispersion A (color particles) having a pigment concentration of 10.2% by mass.

(Resin-Coated Magenta Pigment Dispersion)

A resin-coated magenta pigment dispersion B (color particles) was obtained in the same manner as in the preparation of the resin-coated cyan pigment dispersion except that phthalocyanine blue A220 used as a pigment was changed to CHROMOPHTHAL JET MAGENTA DMQ (Pigment Red 122, manufactured by BASF Japan.).

(Resin-Coated Yellow Pigment Dispersion)

A resin-coated yellow pigment dispersion C (color particles) was obtained in the same manner as in the preparation of the resin-coated cyan pigment dispersion except that phthalocyanine blue A220 used as a pigment was changed to IRGALITE YELLOW (Pigment Yellow 74, manufactured by BASF Japan.).

(Resin-Coated Black Pigment Dispersion)

A resin-coated black pigment dispersion D (color particles) was obtained in the same manner as in the preparation of the resin-coated cyan pigment dispersion except that phthalocyanine blue A220 used as a pigment was changed to CAB-O-JET™ 200 (carbon black, manufactured by Cabot Corporation).

<Compound Having Water-Soluble Group and at Least Two Structures Represented by Formula (1)>

<Polymer Binder>

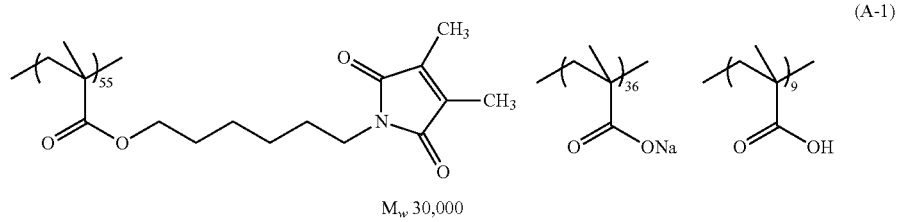

<Water-Miscible Organic Solvent>

2-Pyrrolidone (manufactured by Sigma-Aldrich Japan)

2-Methyl propanediol (manufactured by Sigma-Aldrich Japan)

Dipropylene glycol monomethyl ether (manufactured by Sigma-Aldrich Japan)

γ-Butyrolactone (manufactured by Sigma-Aldrich Japan)

<Water-Soluble Polymerization Initiator>

IRGACURE 2959 (trade name, manufactured BASF Japan)

<Water-Soluble Polymerizable Compound>

Poly(ethylene glycol) diacrylate (Mn=700, manufactured by Sigma-Aldrich Japan)

The compound having a water-soluble group and at least two groups each represented by Formula (1) was synthesized in accordance with JP-A No. 52-988.

Among the compounds used in Examples and Comparative Examples, compounds without indication of manufacturer were obtained by a known method or a method according to a known method.

Examples 1 to 13 and Comparative Example 1

Preparation of Ink Composition

Ink compositions of Examples 1 to 13 and Comparative Example 1 having the compositions shown in Tables 1 and 2 shown below were prepared by stirring the obtained color dispersions A to D using a mixer (L4R, trade name, manufactured by Silverson Machines, Inc.) at 2,500 rpm. The obtained ink compositions were each charged into a plastic disposable syringe, and filtrated using a polyvinylidene fluoride (PVDF) filter having a pore size of 5 μm (MILLEX-SV, trade name, manufactured by Millipore K.K.), to thereby obtain final inks. The numerical values of formulation amounts in Tables 1 and 2 are in terms of mass part(s).

Next, a commercially available inkjet printer (SP-300V, trade name, manufactured by Roland DG Corporation) was used as an inkjet recording apparatus.

The obtained ink compositions were each charged into the inkjet printer, and images were formed on polyvinyl chloride sheets (AVERY 400 GLOSS WHITE PERMANENT, trade name, manufactured by Avery Denison Japan K.K.), respectively, to thereby obtain printed articles for evaluation.

Furthermore, the printed articles were subjected to UV light irradiation by passing the printed articles at a speed of 20 m/min under light of a metal halide lump (MAN400L, trade name, manufactured by GS Yuasa Corporation, maximum wavelength: 365 nm, power: 120 W/cm).

The obtained ink compositions and printed articles were evaluated for the following properties. Results are shown in Tables 1 and 2.

<Evaluation of Adhesiveness (Cross Hatch Test)>

A cross hatch test (JIS K5600-5-6 (or ISO 11341 (2004))) was carried out as a method of evaluating adhesiveness to a base material. Solid images with image portions having an average film thickness of 12 μm were formed in accordance with the inkjet image recording method mentioned above.

After that, the printed articles were subjected to the cross hatch test, respectively. The evaluation criteria were in accordance with JIS K5600-5-6 (or ISO 11341 (2004)), with 6 levels from 0 to 5. Herein, "0" indicates that cut edges are completely smooth, without peeling off of grid square.

<Evaluation of Solvent Resistance>

After solid images each having an average film thickness of 12 μm were formed in accordance with the inkjet image recording method, the surfaces of printed articles were rubbed using a cotton swab impregnated with isopropyl alcohol, and evaluated according to the following criteria.

A: No change in image was observed even after rubbing 10 times or more.

B: The image density decreased after rubbing 5 to 9 times.

C: The image density decreased after rubbing 2 to 4 times.

D: The image density significantly decreased after rubbing once.

<Evaluation of Ejection Property>

The ink compositions were ejected from the head of the inkjet printer for 30 minutes, and the ejection was stopped. After 5 minutes, a solid image and a fine line were recorded on a recording medium (AVERY 400 GLOSS WHITE PERMANTNET, trade name, manufactured by Avery Dennison Japan K.K.), and the obtained image (5 cm×5 cm) was observed. The observed image was visually evaluated in accordance with the following evaluation criteria.

A: Generation of dot defect due to occurrence of dot loss or the like is not observed, and a favorable image was obtained.

B: Few dot defects due to occurrence of dot loss or the like were observed, but it was not a practically problematic level.

C: Dot defects due to occurrence of dot loss or the like were generated, and it was a practically unavailable level.

D: It was not able to eject the ink composition.

<Evaluation of Storage Stability of Ink Composition>

The obtained ink compositions were put into containers and sealed therein, respectively, and were left stand for 2 weeks at 60° C. Then, the ejection property thereof was evaluated in the same manner as described above, in accordance with the same criteria.

TABLE 1

| | | Examples | | | | | | |
|---|---|---|---|---|---|---|---|---|
| | | 1 | 2 | 3 | 4 | 5 | 6 | 7 |
| Component A | A-1 (polymer) | 10 | 10 | — | — | 10 | — | — |
| | A-2 (polymer) | — | — | — | — | — | 10 | — |
| | A-7 (polymer) | — | — | — | — | — | — | 10 |
| | A-8 (polymer) | — | — | 10 | 10 | — | — | — |
| Component B | Pigment dispersion A | 12 | — | — | — | 12 | 12 | 12 |
| | Pigment dispersion B | — | 14 | — | — | — | — | — |
| | Pigment dispersion C | — | — | 12 | — | — | — | — |
| | Pigment dispersion D | — | — | — | 12 | — | — | — |
| Component C | Distilled water | 51.6 | 49.7 | 51.9 | 51.6 | 51.8 | 51.8 | 51.9 |
| Component D | 2-Pyrrolidone | 17 | 17 | 17 | 17 | 17 | 17 | 17 |
| Water-miscible | γ-Butyrolactone | — | — | — | — | — | — | — |
| organic solvent | 2-Methyl propanediol | 9 | 9 | 6 | 6 | 6 | 9 | 9 |
| | Dipropylene glycol monomethyl ether | — | — | 3 | 3 | 3 | — | — |
| Component C:Component D (mass ratio) | | 1:0.5 | 1:0.5 | 1:0.5 | 1:0.5 | 1:0.5 | 1:0.5 | 1:0.5 |
| Polymer binder | A-C | — | — | — | — | — | — | — |
| Water-soluble polymerization initiator | IRGACURE 2959 (manufactured by BASF Japan) | — | — | — | — | — | — | — |
| Water-soluble polymerizable compound | Poly(ethyleneglycol)diacrylate (Mn = 700, manufactured by Sigma-Aldrich) | — | — | — | — | — | — | — |

TABLE 1-continued

|  |  | Examples | | | | | | |
|---|---|---|---|---|---|---|---|---|
|  |  | 1 | 2 | 3 | 4 | 5 | 6 | 7 |
| Sensitizing dye | N-[2-Hydroxy-3-(3,4-dimethyl-9-oxo-9H-thioxanthen-2-yloxy)propyl]-N,N,N-trimethyl aluminum chloride (manufactured by Sigma-Aldrich) | 0.3 | 0.3 | — | 0.3 | 0.1 | 0.1 | — |
| Surfactant | GLIDE 100 (manufactured by Tego Chemical Service) | 0.1 | — | 0.1 | 0.1 | 0.1 | 0.1 | 0.1 |
| Evaluation | Adhesiveness | 2 | 2 | 1 | 0 | 0 | 1 | 2 |
|  | Solvent resistance (after UV irradiation) | A | A | B | A | A | A | B |
|  | Ejection property | A | B | A | A | A | A | A |
|  | Storage stability | A | A | A | A | A | A | A |

TABLE 2

|  |  | Examples | | | | | | Comparative Examples | |
|---|---|---|---|---|---|---|---|---|---|
|  |  | 8 | 9 | 10 | 11 | 12 | 13 | 1 | 2 |
| Component A | A-1 (polymer) | 10 | — | — | — | — | — | — | — |
|  | A-2 (polymer) | — | — | — | — | — | — | — | — |
|  | A-7 (polymer) | — | — | — | — | — | — | — | — |
|  | A-8 (polymer) | — | 10 | 10 | 10 | 10 | 10 | — | — |
| Component B | Pigment dispersion A | 12 | — | — | — | — | — | 12 | 12 |
|  | Pigment dispersion B | — | — | — | — | — | — | — | — |
|  | Pigment dispersion C | — | — | — | — | — | — | — | — |
|  | Pigment dispersion D | — | 12 | 12 | 12 | 12 | 12 | — | — |
| Component C | Distilled water | 51.8 | 77.6 | 64.5 | 59.8 | 48.4 | 45.6 | 51.9 | 51.9 |
| Component D | 2-Pyrrolidone | — | — | — | — | — | — | 17 | — |
| Water-miscible organic solvent | γ-Butyrolactone | 18 | — | 9.2 | 11.8 | 21 | 22.5 | — | 18 |
|  | 2-Methyl propanediol | 8 | — | 3.9 | 6 | 8.2 | 9.5 | 9 | 8 |
|  | Dipropylene glycol monomethyl ether | — | — | — | — | — | — | — | — |
| Component C:Component D (mass ratio) |  | 1:0.5 | — | 1:0.2 | 1:0.3 | 1:0.6 | 1:0.7 | 1:0.5 | — |
| Polymer binder | A-C | — | — | — | — | — | — | 10 | — |
| Water-soluble polymerization initiator | IRGACURE 2959 (manufactured by BASF Japan) | — | — | — | — | — | — | — | 1 |
| Water-soluble polymerizable compound | Poly(ethyleneglycol)diacrylate (Mn = 700, manufactured by Sigma-Aldrich) | — | — | — | — | — | — | — | 9 |
| Sensitizing dye | N-[2-Hydroxy-3-(3,4-dimethyl-9-oxo-9H-thioxanthen-2-yloxy)propyl]-N,N,N-trimethyl aluminum chloride (manufactured by Sigma-Aldrich) | 0.1 | 0.3 | 0.3 | 0.3 | 0.3 | 0.3 | — | — |
| Surfactant | GLIDE 100 (manufactured by Tego Chemical Service) | 0.1 | 0.1 | 0.1 | 0.1 | 0.1 | 0.1 | 0.1 | 0.1 |
| Evaluation | Adhesiveness | 0 | 3 | 2 | 1 | 0 | 1 | 4 | 3 |
|  | Solvent resistance (after UV irradiation) | A | B | A | A | A | B | D | D |
|  | Ejection property | A | B | B | A | A | A | C | C |
|  | Storage stability | A | A | B | A | A | B | B | B |

As shown in Table 1 and Table 2, in the examples of the invention, all of adhesiveness, solvent resistance, ejection property, and storage stability were excellent. In contrast, in the comparative examples, none of adhesiveness, solvent resistance, ejection property, and storage stability were excellent. Furthermore, as shown in Examples 4 and 10 to 13, when the ink composition contained a water-miscible organic solvent and had a mass ratio between water and the water-miscible organic solvent (i.e., water:water-miscible organic solvent) in a range from 1:0.3 to 1:0.6, particularly excellent effects were achieved.

JP-A No. 2005-307199 discloses an invention that relates to a technique using a photopolymerization initiator. In the invention, undecomposed photopolymerization initiator and/or unreacted components may be left in a cured film, which may cause adverse effects on film physical property and/or a printed article. Therefore, there is a case in which an adequate amount of photopolymerization initiator cannot be used. Thus, further improvements in adhesiveness, solvent resistance, or the like of a printed image may be possible. Furthermore, further improvements in ejection property, storage stability, or the like of an ink composition may be possible. Accordingly, an aqueous ink composition having favorable adhesiveness, solvent resistance, ejection stability, and storage stability is desired.

According to the invention, an aqueous ink composition is provided, which has excellent ejection property at the time of recording an image by an inkjet method, imparts excellent solvent resistance and adhesiveness with a base material to a recorded image, and has excellent storage stability.

What is claimed is:

1. An aqueous ink composition, comprising:
Component A, a copolymer represented by the following Formula (A'):

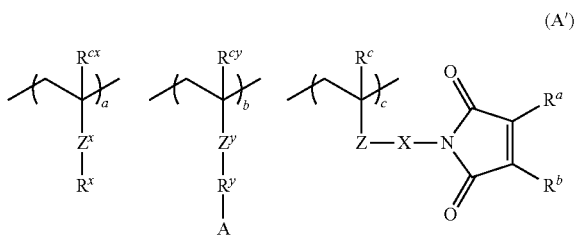

(A')

wherein in Formula (A'), each $R^{cx}$ independently represents a hydrogen atom or a methyl group;

$Z^x$ represents —COO—, —CONR$^{dx}$—, or a single bond, where $R^{dx}$ represents a hydrogen atom or an alkyl group having 1 to 4 carbon atoms;

$R^x$ represents a hydrogen atom, an alkyl group having 1 to 10 carbon atoms, an aryl group having 6 to 20 carbon atoms, or an aralkyl group having 7 to 20 carbon atoms; and a, b, and c are copolymerization ratios in the polymer compound, where the sum of a, b, and c is 100, and $30 \leq a+b \leq 90$ and $10 \leq c \leq 70$;

$R^a$ and $R^b$ each independently represents an alkyl group having 1 to 4 carbon atoms and $R^a$ and $R^b$ may be bonded to each other to form a 4-membered to 6-membered ring;

$R^c$ represents a hydrogen atom or a methyl group;

Z represents —COO— or —CONR$^d$, where $R^d$ represents a hydrogen atom or an alkyl group having 1 to 4 carbon atoms;

X represents a divalent organic group;

$R^{cy}$ represents a hydrogen atom or a methyl group;

$Z^y$ represents —COO—, —CONR$^{dy}$—, or a single bond, where $R^{dy}$ represents a hydrogen atom or an alkyl group having 1 to 4 carbon atoms;

$R^y$ represents a single bond or a divalent organic group; and

A represents a water-soluble group;

Component B, a resin-coated pigment;
Component C, water; and
Component D, a water-miscible organic solvent comprising at least two selected from the group consisting of 2-pyrrolidone, 2-methyl propanediol, and γ-butyrolactone, wherein the mass ratio of Component C to Component D is from 1:0.2 to 1:2.

2. The aqueous ink composition according to claim 1, wherein the water-soluble group A is at least one group selected from the group consisting of an alkali metal salt and an onium salt of carboxylic acid, an alkali metal salt and an onium salt of sulfonic acid, phosphoric acid, an alkali metal salt and an onium salt of phosphoric acid, phosphonic acid, an alkali metal salt and an onium salt of phosphonic acid, and a quaternary ammonium salt.

3. The aqueous ink composition according to claim 1, wherein the mass ratio of Component C to Component D is from 1:0.3 to 1:0.6.

4. An inkjet recording method, comprising:
applying the aqueous ink according to claim 1 onto a recording medium;
irradiating the applied aqueous ink composition with active energy radiation; and
drying by heating the applied aqueous ink composition.

5. An inkjet printed article comprising an image recorded by the inkjet recording method according to claim 4.

* * * * *